US007903269B2

(12) United States Patent
Nakagawa et al.

(10) Patent No.: US 7,903,269 B2
(45) Date of Patent: Mar. 8, 2011

(54) ABNORMALITY DETERMINING APPARATUS, IMAGE FORMING APPARATUS INCLUDING THE ABNORMALITY DETERMINING APPARATUS, AND ABNORMALITY DETERMINING METHOD

(75) Inventors: Yoshinori Nakagawa, Yokohama (JP); Hisashi Shoji, Kawasaki (JP); Yasushi Nakazato, Tokyo (JP); Satoshi Ouchi, Tokyo (JP); Nekka Matsuura, Yokohama (JP); Osamu Satoh, Sagamihara (JP); Shuji Hirai, Tokyo (JP); Seiji Hoshino, Atsugi (JP); Katsuaki Miyawaki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1267 days.

(21) Appl. No.: 11/156,552

(22) Filed: Jun. 21, 2005

(65) Prior Publication Data

US 2005/0281596 A1 Dec. 22, 2005

(30) Foreign Application Priority Data

Jun. 21, 2004 (JP) ................................ 2004-183031

(51) Int. Cl.
*G06K 15/00* (2006.01)
*G06F 3/12* (2006.01)
*G03G 15/00* (2006.01)
*G03G 15/22* (2006.01)

(52) U.S. Cl. ...................... 358/1.14; 358/1.15; 358/1.16; 399/9; 399/10; 399/18; 399/130; 702/185

(58) Field of Classification Search ................. 358/1.14, 358/1.9, 1.15, 1.16; 399/9, 10, 18, 130; 702/185
See application file for complete search history.

(56) References Cited

U.S. PATENT DOCUMENTS 4,358,520 A * 11/1982 Hirayama ........................ 430/54
4,589,080 A * 5/1986 Abbott et al. ................. 702/183
4,653,899 A * 3/1987 Watanabe ..................... 399/183
5,003,346 A * 3/1991 Masuda et al. .................. 355/57

(Continued)

FOREIGN PATENT DOCUMENTS

JP 64-081080 3/1989

(Continued)

OTHER PUBLICATIONS

U.S. Appl. No. 12/250,859, filed Oct. 14, 2008, Shoji, et al.

(Continued)

*Primary Examiner* — Edward L Coles
*Assistant Examiner* — Hilina S Kassa
(74) *Attorney, Agent, or Firm* — Oblon, Spivak, McClelland, Maier & Neustadt, L.L.P.

(57) ABSTRACT

An abnormality determining apparatus includes an information storing device that stores information, an information obtaining device that obtains information of a detection subject, a receiving device that receives abnormality presence/absence information indicative of the presence or absence of an abnormality in the detection subject detected by a user, a normal group data set constructing device that constructs a normal group data set that is a collection of normal data indicating that the detection subject is in a normal state based on the abnormality presence/absence information received by the receiving device and based on the information obtained by the information obtaining device during a preset period, and a determining device that determines the presence or absence of an abnormality in the detection subject by performing calculations based on the normal group data set stored in the information storing device and based on the information obtained by the information obtaining device.

28 Claims, 20 Drawing Sheets

U.S. PATENT DOCUMENTS

| | | | | | |
|---|---|---|---|---|---|
| 5,488,454 | A * | 1/1996 | Fukada et al. | .................... | 399/1 |
| 5,950,036 | A * | 9/1999 | Konishi | ............................ | 399/8 |
| 6,100,996 | A * | 8/2000 | Amano et al. | ................. | 358/1.9 |
| 6,122,461 | A * | 9/2000 | Shinohara | ....................... | 399/43 |
| 6,975,338 | B2 * | 12/2005 | Hirai et al. | .................... | 347/133 |
| 7,113,296 | B1 * | 9/2006 | Tomidokoro et al. | ........ | 358/1.15 |
| 7,120,365 | B2 * | 10/2006 | Yamazaki | ......................... | 399/8 |
| 7,184,674 | B2 * | 2/2007 | Satoh et al. | ..................... | 399/34 |
| 7,193,642 | B2 * | 3/2007 | Hirai et al. | .................... | 347/236 |
| 7,539,599 | B2 * | 5/2009 | Hasegawa et al. | ............ | 702/185 |
| 7,778,555 | B2 * | 8/2010 | Shoji et al. | ........................ | 399/9 |
| 2001/0036370 | A1 * | 11/2001 | Inoue | .............................. | 399/49 |
| 2003/0095287 | A1 * | 5/2003 | Miyagi et al. | .................. | 358/2.1 |
| 2004/0252324 | A1 * | 12/2004 | Ohta | ............................ | 358/1.14 |
| 2005/0002054 | A1 | 1/2005 | Shoji et al. | | |
| 2005/0058474 | A1 | 3/2005 | Watanabe et al. | | |
| 2005/0100374 | A1 | 5/2005 | Satoh et al. | | |

FOREIGN PATENT DOCUMENTS

| | | | |
|---|---|---|---|
| JP | 09055932 | A * | 2/1997 |
| JP | 2002-267533 | | 9/2002 |

OTHER PUBLICATIONS

"Technical Developments in the MT System", Jun. 20, 2002, pp. 1-466, (with English Abstract).
U.S. Appl. No. 11/671,475, filed Feb. 6, 2007, Shoji, et al.
U.S. Appl. No. 11/452,411, filed Jun. 14, 2006, Shoji, et al.
U.S. Appl. No. 10/972,384, filed Oct. 26, 2004, Nakazato.
U.S. Appl. No. 10/986,781, filed Nov. 15, 2004, Matsuura et al.
U.S. Appl. No. 11/020,729, filed Dec. 27, 2004, Shoji et al.
U.S. Appl. No. 12/120,702, filed May 15, 2008, Hirai.
U.S. Appl. No. 11/857,132, filed Sep. 18, 2007, Satoh, et al.
U.S. Appl. No. 11/856,348, filed Sep. 17, 2007, Nakazato, et al.

* cited by examiner

FIG. 8

| GROUP NUMBER (i) | INFORMATION TYPE (j) | | | |
|---|---|---|---|---|
| | (1) | (2) | · · · | (k) |
| 1 | $y_{11}$ | $y_{12}$ | · · · | $y_{1k}$ |
| 2 | $y_{21}$ | $y_{22}$ | · · · | $y_{2k}$ |
| : | : | : | · · · | : |
| n | $y_{n1}$ | $y_{n2}$ | · · · | $y_{nk}$ |
| AVERAGE ($\bar{y}$) | $\bar{y}_1$ | $\bar{y}_2$ | · · · | $\bar{y}_k$ |
| STANDARD DEVIATION ($\sigma$) | $\sigma_1$ | $\sigma_2$ | · · · | $\sigma_k$ |

FIG. 9

| GROUP NUMBER (i) | INFORMATION TYPE (j) | | | |
|---|---|---|---|---|
| | (1) | (2) | · · · | (k) |
| 1 | $Y_{11}$ | $Y_{12}$ | · · · | $Y_{1k}$ |
| 2 | $Y_{21}$ | $Y_{22}$ | · · · | $Y_{2k}$ |
| : | : | : | · · · | : |
| n | $Y_{n1}$ | $Y_{n2}$ | · · · | $Y_{nk}$ |
| AVERAGE ($\bar{y}$) | 0 | 0 | · · · | 0 |
| STANDARD DEVIATION ($\sigma$) | 1 | 1 | · · · | 1 |

ABNORMALITY DETERMINING APPARATUS, IMAGE FORMING APPARATUS INCLUDING THE ABNORMALITY DETERMINING APPARATUS, AND ABNORMALITY DETERMINING METHOD

CROSS-REFERENCE TO RELATED APPLICATIONS

This application claims priority to Japanese Patent Application No. 2004-183031 filed in the Japanese Patent Office on Jun. 21, 2004, the entire contents of which is hereby incorporated by reference herein.

BACKGROUND OF THE INVENTION

1. Field of the Invention

The present invention relates to an abnormality determining apparatus and an abnormality determining method for determining the presence or absence of an abnormality in a detection subject based on a result obtained by an information obtaining device that obtains information of the detection subject.

2. Discussion of the Background

An abnormality determining apparatus that determines the presence or absence of an abnormality in a detection subject has been used. For example, a thermal test device used in an electric control circuit is an example of an abnormality determining apparatus that determines an abnormality in an electronic product acting as a detection subject when the electronic product consumes electric power exceeding a threshold value. This thermal test device determines the presence of an abnormality based on one type of parameter such as electric power consumption. However, in various types of devices on the market, it may be difficult to determine the presence of an abnormality based on only one type of parameter, and it may be necessary to take an interrelation among a plurality of parameters into consideration to detect an abnormality.

For example, in an image forming apparatus a decrease of density of an output image may occur. Even if an image forming apparatus has no abnormality, the decrease of density of an output image may similarly occur. Specifically, when solid images are continuously output while consuming a large amount of toner and a developing device cannot be replenished with a sufficient amount of toner, the decrease of density of an output image typically occurs even if the apparatus has no abnormality. In this case, it cannot be determined whether such a density decrease is caused by an abnormality of the apparatus based on only one parameter such as density of an output image. It is necessary to determine the presence of an abnormality based on an interrelation among a plurality of parameters, such as a number of continuous prints, and an output image pixel of each print.

A Mahalanobis Taguchi System (MTS), described in the Japanese Standards Association publication "Technical Developments in the MT System" by Genichi TAGUCHI, is known as a method of determining an abnormality. This MTS method measures the degree of normality in the state of an object in the following manner. First, a plurality of combined normal values relating to a group of information including a plurality of types of information indicating the state of a detection subject are obtained, and a normal group data set is constructed therefrom. To take a medical checkup as an example, first combined normal values including the gender, various blood test results, height, weight, and so on of a healthy person are obtained in advance from a plurality of healthy people, and a normal group data set is constructed therefrom. Next, a multidimensional space is constructed based on the normal group data set. The Mahalanobis distance, which indicates the position of the grouped information obtained from the detection subject in this multidimensional space, is then determined, and an evaluation is performed to determine the degree of similarity between the grouped information for the detection subject and the normal group data set. With this MTS method, the degree of normality of the detection subject can be determined comprehensively based on the interrelation among a plurality of parameters.

The present inventors are currently developing a novel abnormality determining apparatus that determines the presence of various types of abnormalities in an image forming apparatus by using the MTS method. However, the following problems still need to be addressed.

The first problem is that an operation for constructing a normal group data set is complicated. There are two main methods of constructing a normal group data set of an image forming apparatus. In the first method, various types of parameters are obtained while making test runs of a normal standard machine of an image forming apparatus, and a normal group data set is constructed based on the obtained results. Such a normal group data set is used as a common normal group data set for each image forming apparatus shipped from a factory. In the second method, various types of parameters are obtained while making test runs of each of image forming apparatuses in a normal state before factory shipment. Then, a unique normal group data set is individually constructed based on the obtained results for each image forming apparatus.

In the first method, an operation for constructing a normal group data set can be efficiently performed only one time. However, because variations in a component size and in accuracy of attachments of components among image forming apparatuses are not reflected in a normal group data set, accuracy of abnormality determination is degraded. For this reason, the second method is preferably used, which can reflect such variations in a normal group data set. However, in the second method, production costs significantly increase due to complicated operations for obtaining various types of parameters while making test runs of each product at the factory before shipment.

The second problem is that abnormalities are not always detected at a timing which is appropriate for each user. Specifically, depending on the type of fault, each user has a widely differing perception thereof. For example, one user may suspect a fault in a sheet feeding system even if a sheet jam occurs rarely, whereas another user may not suspect a fault in a sheet feeding system even if sheet jams occur comparatively frequently. In the case of the latter user, if the user is notified of an occurrence of a fault in a sheet feeding system when an abnormality rarely occurs in the sheet feeding system, the user feels inconvenienced.

These problems relating to an abnormality determining apparatus are described on the assumption that an image forming apparatus is a detection subject. However, similar problems may occur when determining the presence or absence of abnormality in a detection subject other than the image forming apparatus.

SUMMARY OF THE INVENTION

Therefore, as discovered by the present inventors, it is desirable to provide an abnormality determining apparatus that can accurately determine the presence or absence of abnormality in each detection subject without performing complicated operations before shipping the detection subject from a factory, and that can detect an occurrence of abnormality at an appropriate timing for each user.

According to an aspect of the present invention, an abnormality determining apparatus includes an information storing device configured to store information, an information obtaining device configured to obtain information of a detection subject, and a receiving device configured to receive abnormality presence/absence information indicative of the presence or absence of an abnormality in the detection subject detected by a user. The abnormality determining apparatus further includes a normal group data set constructing device configured to construct a normal group data set that is a collection of normal data indicating that the detection subject is in a normal state based on the abnormality presence/absence information received by the receiving device and based on the information obtained by the information obtaining device during a preset period, and a determining device configured to determine the presence or absence of an abnormality in the detection subject by performing calculations based on the normal group data set stored in the information storing device and based on the information obtained by the information obtaining device.

According to another aspect of the present invention, an image forming apparatus includes a visual image forming device configured to form a visual image on a recording medium, and the above-described abnormality determining apparatus.

According to yet another aspect of the present invention, an abnormality determining method includes: obtaining information of a detection subject; receiving abnormality presence/absence information indicative of the presence or absence of an abnormality in the detection subject detected by a user; constructing a normal group data set that is a collection of normal data indicating that the detection subject is in a normal state based on the received abnormality presence/absence information and the information obtained during a preset period; and determining the presence or absence of an abnormality in the detection subject by performing calculations based on the constructed normal group data set and the obtained information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is an obtained data table used in a normal group data set constructing process;

FIG. 9 is a normalized data table constructed in an information normalization process;

DETAILED DESCRIPTION OF THE PREFERRED EMBODIMENTS

Figure 1:
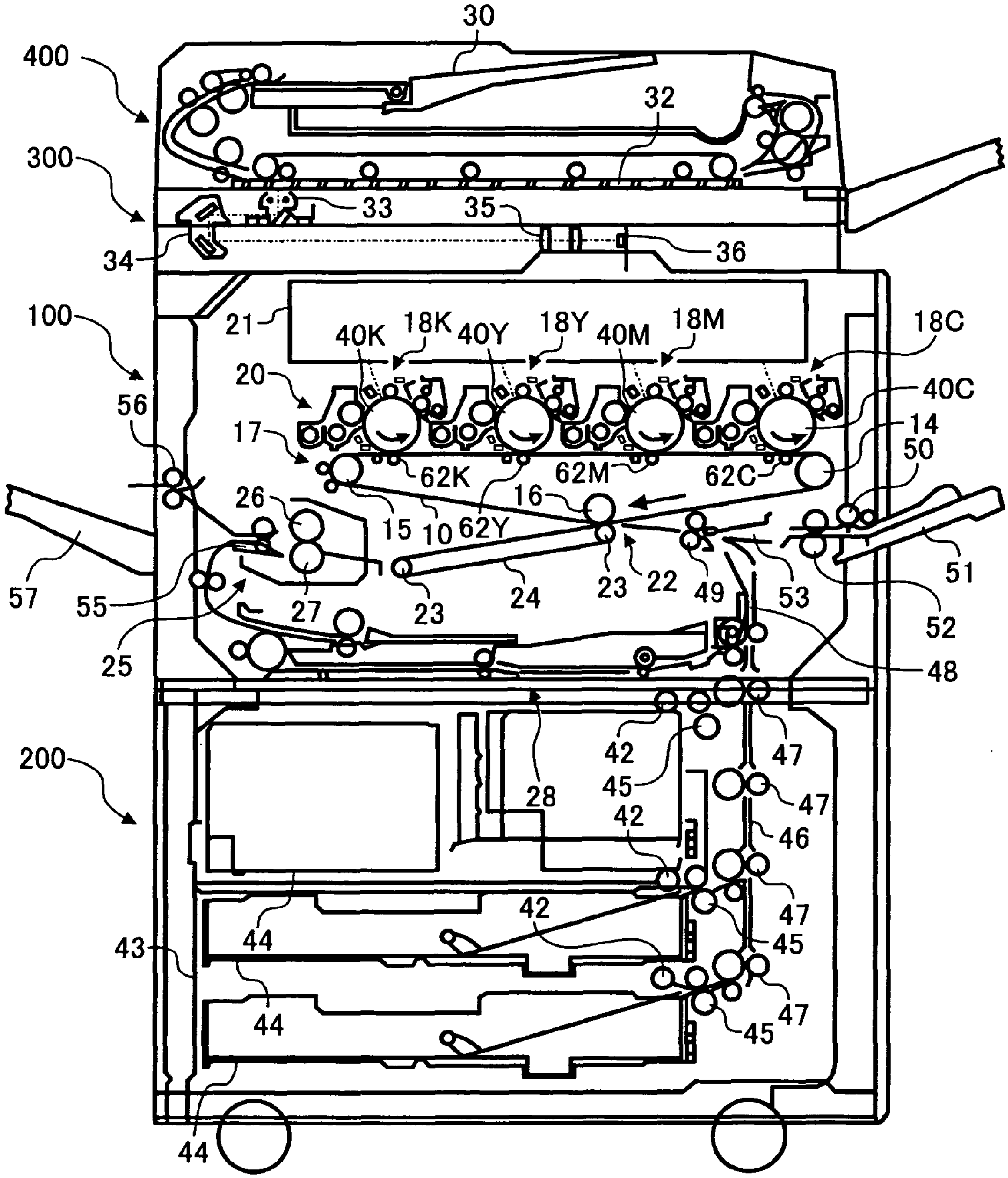
FIG. 1 is a schematic cross section of an image forming apparatus used as a detection subject of an abnormality determining apparatus according to an embodiment of the present invention.

Example of embodiments of the present invention are described with reference to the drawings, wherein like reference numerals designate identical or corresponding parts throughout the views.

First, an example of an image forming apparatus acting as a detection subject of an abnormality determining apparatus is described. The image forming apparatus may be, for example, a copying machine, a printer, a facsimile, or other similar image forming apparatuses.

FIG. 1 is a schematic cross section of an image forming apparatus used as a detection subject of an abnormality determining apparatus according to an embodiment of the present invention. The image forming apparatus includes an image forming device having a printer unit 100, a sheet feeding unit 200, a scanner unit 300, and an automatic document feeder (ADF) 400. The scanner unit 300 is attached to the top of the printer unit 100. The ADF 400 is attached to the top of the scanner unit 300.

The scanner unit 300 reads image information of an original document placed on a contact glass 32 with an image reading sensor 36, and transmits the read image information to a control unit (not shown). The control unit controls a laser, LED (not shown), or the like, disposed in an exposure device 21 of the printer unit 100 based on the image information received from the scanner unit 300 to irradiate four drum-shaped photoreceptors 40K, 40Y, 40M, 40C with a writing laser beam L. By this irradiation, an electrostatic latent image is formed on each of the surfaces of the photoreceptors 40K, 40Y, 40M, 40C. Each electrostatic latent image is developed with toner in developing processing, and a toner image of each color is formed. The suffixes K, Y, M, C following the reference numerals correspond to black, yellow, magenta, and cyan images, respectively.

The printer 100 further includes primary transfer rollers 62K, 62Y, 62M, 62C, a secondary transfer device 22, a fixing device 25, a sheet discharging device (not shown), and a toner supply device (not shown).

The sheet feeding unit 200 includes an automatic sheet feeding section disposed beneath the printer unit 100 and a manual sheet feeding section disposed on the side surface of the printer unit 100. The automatic sheet feeding section includes a plurality of sheet feeding cassettes 44 provided in a sheet bank 43, a sheet feeding roller 42 that feeds a transfer sheet as a recording medium from each of the sheet feeding cassettes 44, and a sheet separation roller 45 that feeds transfer sheets one by one to a sheet feeding path 46. The automatic sheet feeding section further includes sheet conveyance rollers 47 that convey a transfer sheet to a sheet conveyance path 48 in the printer unit 100. The manual sheet feeding section includes a manual sheet feeding tray 51, a sheet feeding roller 50, and a separation roller 52 that feeds transfer sheets set on the manual sheet feeding tray 51 one by one to a sheet feeding path 53.

A pair of registration rollers 49 are disposed near the end of the sheet conveyance path 48 in the printer unit 100. After the registration rollers 49 receive the transfer sheet fed from one of the sheet feeding cassettes 44 or the manual sheet feeding tray 51, the registration rollers 49 feed the transfer sheet to a secondary transfer nip part formed between an endless intermediate transfer belt 10 acting as an intermediate transfer element and a secondary transfer device 22 at a predetermined timing.

When performing a copying operation in the image forming apparatus, an operator sets an original document on an original document tray 30 in the ADF 400. In another case, the operator opens the ADF 400, sets an original document on the contact glass 32 in the scanner unit 300, and then closes the ADF 400. When the original document is set on the original document tray 30, upon pressing a start switch (not shown), the scanner unit 300 is driven after the original document is conveyed to the contact glass 32. When the original document is set on the contact glass 32, upon pressing a start switch (not shown), the scanner unit 300 is immediately driven. In both the above-described cases, first and second carriages 33 and 34 in the scanner unit 300 are driven. A light source carried on the first carriage 33 irradiates an image surface of the original document with light. The light reflected from the image surface of the original document is directed to the second carriage 34. The light reflected from a mirror carried on the second carriage 34 is imaged on the image reading sensor 36 through an imaging lens 35.

Further, upon pressing a start switch (not shown), a drive motor (not shown) drives one of support rollers 14, 15, and 16 around which the intermediate transfer belt 10 is spanned, thereby rotating the intermediate transfer belt 10. Then, the above-described laser writing processing and developing processing (described below) are performed. Monochrome images such as black, yellow, magenta, and cyan toner images are formed on the photoreceptors 40K, 40Y, 40M, and 40C, respectively, while rotating the photoreceptors. While the intermediate transfer belt 10 rotates, the black, yellow, magenta, and cyan toner images are sequentially and electrostatically transferred from the photoreceptors 40K, 40Y, 40M, and 40C onto the intermediate transfer belt 10 at primary transfer nip parts where the photoreceptors 40K, 40Y, 40M, and 40C contact the intermediate transfer belt 10, and are each superimposed thereon. As a result, a superimposed full-color toner image is formed on the intermediate transfer belt 10.

Further, upon pressing a start switch (not shown), one of the sheet feeding rollers 42 in the sheet feeding unit 200 is driven to feed a transfer sheet of a size corresponding to image information out of one of the sheet feeding cassettes 44. Then, the transfer sheet is directed to the sheet conveying path 48 provided in the printer unit 100, and then abuts against the nip part between the registration rollers 49. Alternatively, a transfer sheet is fed out from the manual sheet feeding tray 51 by rotating the sheet feeding roller 50, and abuts against the nip part between the registration rollers 49. The registration rollers 49 start conveying the transfer sheet in synchronism with the rotation of the intermediate transfer belt 10 that carries the full-color toner image thereon, to a secondary transfer nip part between the intermediate transfer belt 10 and a secondary transfer roller 23 of a secondary transfer device 22 provided below the lower run of the intermediate transfer belt 10. In the secondary transfer device 22, an endless secondary transfer belt 24 is spanned around two rollers 23 and pressed against the support roller 16 via the intermediate transfer belt 10. The secondary transfer device 22 transfers the full-color toner image from the intermediate transfer belt 10 to the transfer sheet under the influence of a transfer electric field and pressure at the secondary transfer nip part.

The endless secondary transfer belt 24 conveys the transfer sheet having the transferred full-color toner image to a fixing device 25. In the fixing device 25, a press roller 27 is pressed against a fixing roller 26. The fixing device 25 fixes the image on the transfer sheet under the influence of pressure and heat. Subsequently, a separation pick 55 directs the transfer sheet toward sheet discharging rollers 56. The transfer sheet is discharged by the sheet discharging rollers 56 and stacked on a sheet discharging tray 57 provided on the side surface of the printer unit 100.

Figure 2:
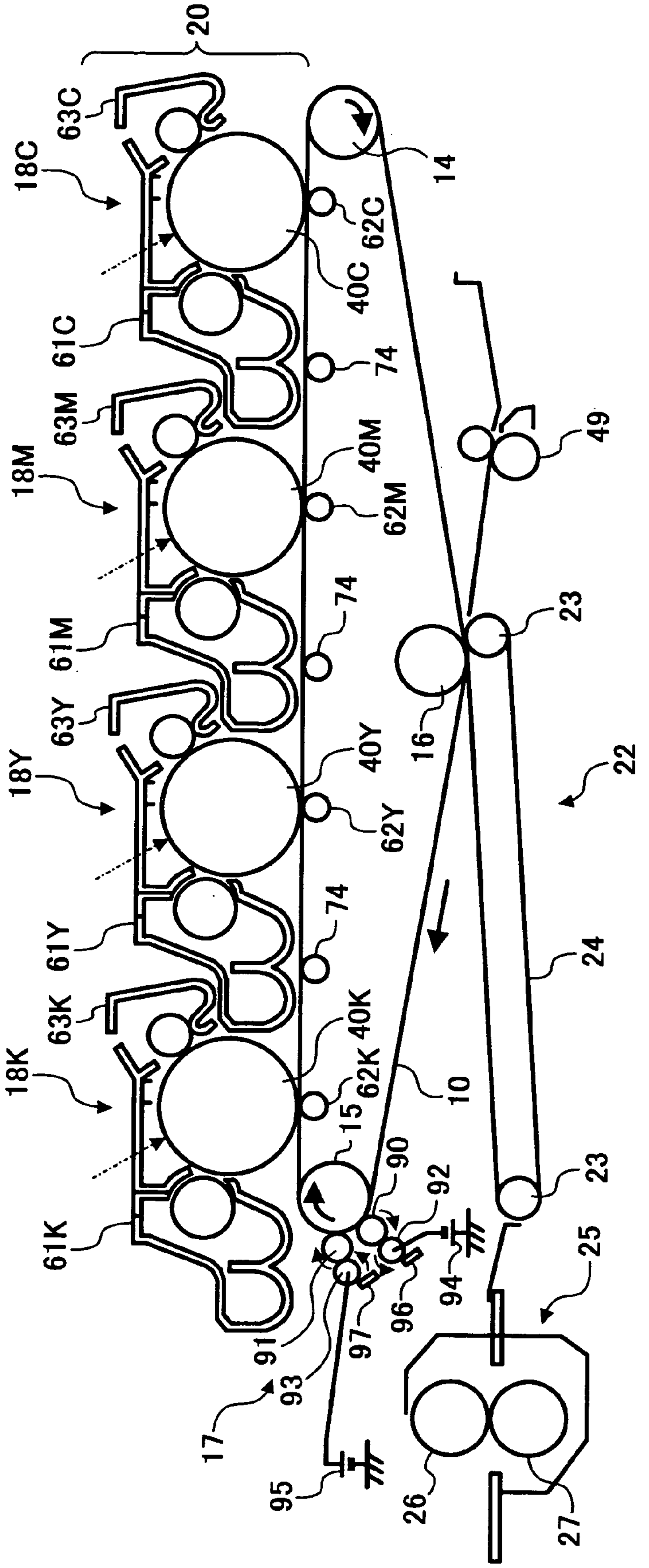
FIG. 2 is a schematic enlarged view of a printer unit of the image forming apparatus of FIG. 1.

FIG. 2 is a schematic enlarged view of the printer unit 100. The printer unit 100 includes a belt unit, four process units 18K, 18Y, 18M, and 18C that form toner images in each color, respectively, the secondary transfer device 22, a belt cleaning device 17, and the fixing device 25.

In the belt unit, the intermediate transfer belt 10 spanned around the support rollers 14, 15, and 16 moves while contacting the photoreceptors 40K, 40Y, 40M, and 40C. At the primary transfer nip parts where the photoreceptors 40K, 40Y, 40M, and 40C contact the intermediate transfer belt 10, the intermediate transfer belt 10 is pressed toward the photoreceptors 40K, 40Y, 40M, and 40C from the rear surface side thereof by the primary transfer rollers 62K, 62Y, 62M, and 62C. A primary transfer bias is applied to the primary transfer rollers 62K, 62Y, 62M, and 62C by power sources (not shown), respectively. As a result, a primary transfer electric field is formed at the primary transfer nip parts, which causes the toner images formed on the photoreceptors 40K, 40Y, 40M, and 40C to electrostatically transfer to the intermediate transfer belt 10. Conductive rollers 74 contacting the rear surface of the intermediate transfer belt 10 are disposed between each of the primary transfer rollers 62K, 62Y, 62M, and 62C. The conductive rollers 74 prevent the primary transfer bias applied to the primary transfer rollers 62K, 62Y, 62M, and 62C from flowing into the adjacent process unit via a medium resistance base layer on the rear surface side of the intermediate transfer belt 10.

In this embodiment, each photoreceptor (40K, 40Y, 40M, or 40C) and other units are integrally assembled in each of the process units 18K, 18Y, 18M, and 18C. The process units 18K, 18Y, 18M, and 18C are detachably attached to the printer unit 100 for easy maintenance. For example, the black process unit 18K includes the photoreceptor 40K, a developing unit 61K, a photoreceptor cleaning unit 63K, a discharging unit (not shown), and a charging unit (not shown). The developing unit 61K develops an electrostatic latent image formed on the surface of the photoreceptor 40K with black toner and forms a black toner image. The photoreceptor cleaning unit 63K removes residual toner adhered to the surface of the photoreceptor 40K after passing through the primary transfer nip part. The discharging unit discharges the surface of the photoreceptor 40K after the cleaning processing. The charging device uniformly charges the surface of the photoreceptor 40K after the discharging processing to prepare for a next image forming operation. The configurations and operations of the units, such as the photoreceptors 40K, 40Y, 40M, and 40C, the developing units 61 K, 61Y, 61M, and 61C, the photoreceptor cleaning units 63K, 63Y, 63M, and 63C of each of the four process units 18K, 18Y, 18M, and 18C are substantially the same except for the color of toner used therein. The image forming apparatus of this embodiment employs a so-called tandem type construction in which the four process units 18K, 18Y, 18M, and 18C are arranged side by side above and along the upper and substantially horizontal run of the intermediate transfer belt 10 between the support rollers 14 and 15.

Figure 3:
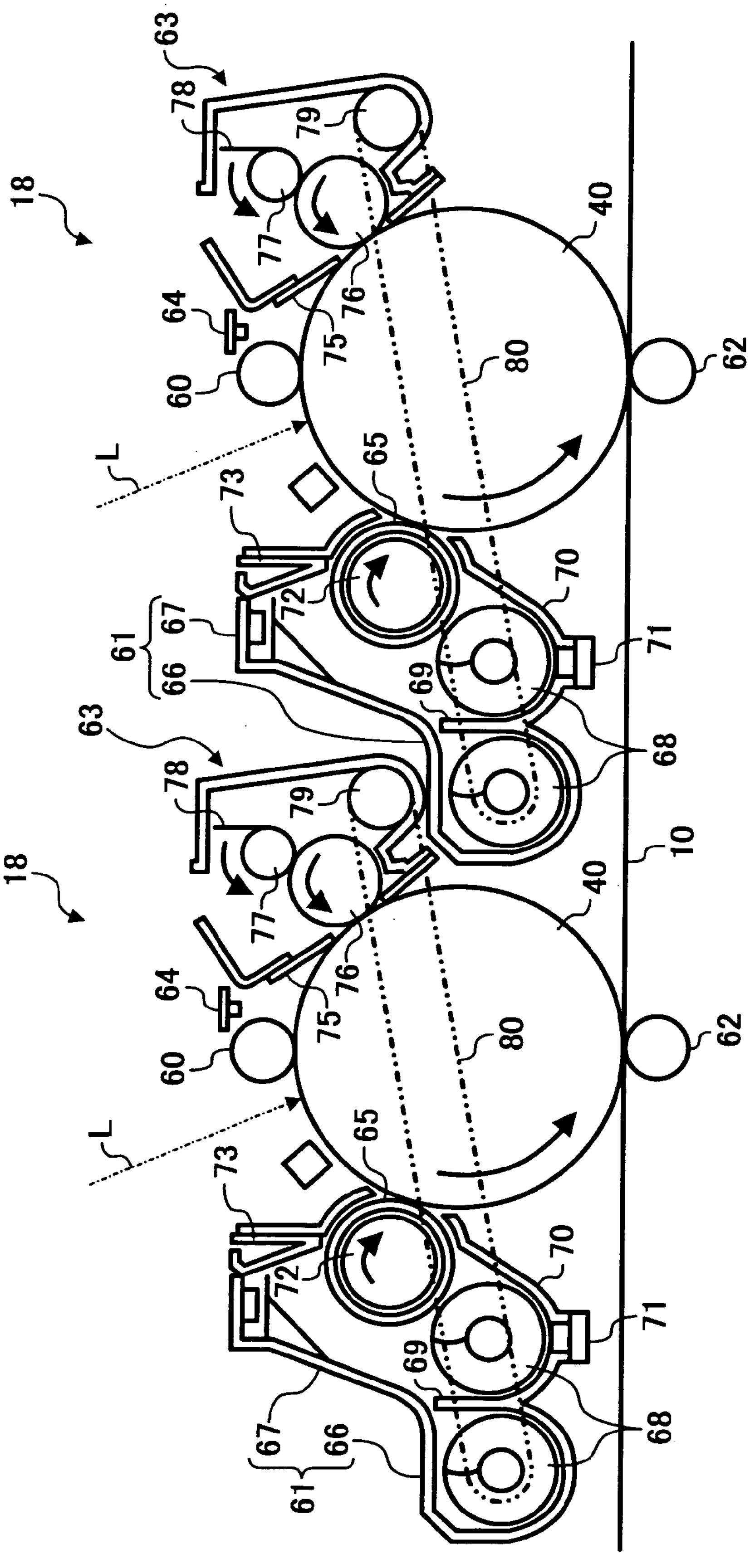
FIG. 3 is a schematic enlarged view of a part of a tandem image forming section of the image forming apparatus of FIG. 1.

FIG. 3 is a schematic enlarged view of a part of a tandem image forming section 20 including the four process units 18K, 18Y, 18M, and 18C. The configurations and operations of the four process units 18K, 18Y, 18M, and 18C are substantially the same except for the color of toner used therein. Therefore, the suffixes K, Y, M, and C attached to each reference numeral are omitted in FIG. 3. As illustrated in FIG. 3, in each process unit 18, arranged around the photoreceptor 40 are a charging unit 60, the developing unit 61, the primary transfer roller 62, the photoreceptor cleaning unit 63, a discharging unit 64, etc.

A drum-shaped object constructed from a cylinder made of aluminum or the like, which is coated with an organic photosensitive material having a photosensitive property to form a photosensitive layer, is used as the photoreceptor 40. The photoreceptor 40 may be in a shape of an endless belt instead of a drum. The charging unit 60 is constructed from a charging roller that charges the photoreceptor 40 by applying voltages thereto. In this case, the charging roller contacts the photoreceptor 40. In place of the charging roller, the charging unit may be a non-contact type charging unit, such as a scorotron charger.

The developer used in the developing unit 61 is a two-component developer including a mixture of a non-magnetic toner and a magnetic carrier. The developing unit 61 is mainly constructed from a developer agitating section 66 and a developing section 67. The developer agitating section 66 conveys the developer while agitating the developer and supplies the developer to a developing sleeve 65. The developing section 67 transfers the toner in the developer from the developing sleeve 65 to the photoreceptor 40.

The developer agitating section 66 is positioned at a lower level than the developing section 67. The developer agitating section 66 includes two parallel screws 68 partitioned by a partition plate 69 except for both end portions thereof. Further, a toner density sensor 71 is attached to a bottom surface of a case 70 for detecting the toner density of the developer.

The developing sleeve 65 disposed in the developing section 67 faces the photoreceptor 40 through an opening formed in the case 70. Further, a developer regulating member 73 is spaced a predetermined distance, for example about 500 μm, apart from the surface of the developing sleeve 65. The developing sleeve 65 is rotatably provided and formed from a non-magnetic sleeve-shaped member. The developing sleeve 65 includes a magnet roller 72.

In the developing device 61, the two screws 68 circulate the developer in the case 70 while agitating the developer and supply the developer to the developing sleeve 65. The magnet roller 72 magnetically scoops up the developer onto the developing sleeve 65. The scooped-up developer is held on the developing sleeve 65, forming a magnet brush. While the developing sleeve 65 rotates and conveys the magnet brush, the developer regulating member 73 regulates the height of the magnet brush (i.e., the amount of the developer). The excess developer removed by the developer regulating member 73 is returned to the developer agitating section 66.

The toner in the developer transferred from the developing sleeve 65 to the photoreceptor 40 develops a latent image formed on the photoreceptor 40 to form a toner image. After development, the developer remaining on the developing sleeve 65 leaves, at a position where the magnet roller 72 ceases to exert a magnetic force, and returns to the developer agitating section 66. When the density of toner in the developer agitating section 66 decreases due to repeated development, fresh toner is replenished to the developer agitating section 66 based on the detection result of the toner density sensor 71. Instead of the two-component developer, the developing unit 61 may use one component developer including a toner, not a magnetic carrier. In this embodiment, the developing sleeve 65 has a diameter of about 18 mm, and the surface thereof is subjected, for example, to sandblast processing or a processing to form a plurality of grooves having a depth of one to several millimeters such that the surface roughness (Rz) is approximately about 10 μm to 30 μm.

In the image forming apparatus, as examples, the linear speed of the photoreceptor 40 is set to about 200 mm/sec, and the linear speed of the developing sleeve 65 is set to about 240 mm/sec. The diameter of the photoreceptor 40 is set to about 50 mm, the thickness thereof is set to about 30 μm, the beam spot diameter of the optical system is set to about 50×60 μm, and the light quantity is set to about 0.47 mW. The charging potential V0 (before exposure) of the photoreceptor 40 is set to about −700V, the post-exposure potential VL is set to about −120V, and the developing bias voltage is set to about −470V. That is, development is performed at a developing potential of about 350V.

The charging amount of the toner on the developing sleeve 65 is preferably within a range of about −10 to −30 μC/g. A developing gap formed between the photoreceptor 40 and the developing sleeve 65 may be set within a range of about 0.4 to 0.8 mm. However, the developing efficiency can be improved by reducing the developing gap.

The photoreceptor cleaning unit 63 includes a cleaning blade 75, made of, for example, polyurethane rubber, contacting the photoreceptor 40 at its edge. A conductive fur brush 76 is rotatably held in contact with the photoreceptor 40. Further, a metallic roller 77 is rotatably provided to apply a bias to the fur brush 76. The leading edge of a scraper 78 is pressed against the metallic roller 77. A screw 79 collects the toner removed from the photoreceptor 40.

Specifically, the fur brush 76, rotating in a direction counter to the photoreceptor 40, removes residual toner from the photoreceptor 40. The metallic roller 77 rotates in a direction counter to the fur brush 76 while applying a bias to the fur brush 76, thereby removing the toner from the fur brush 76. Further, the scraper 78 removes the toner from the metallic roller 77. The toner which gathers in the photoreceptor cleaning unit 63 is moved to one side of the photoreceptor cleaning unit 63 by the screw 79, and is returned to the developing device 61 by a toner recycling device 80 for reuse.

The discharging unit 64 is constructed from a discharging lamp or the like which emits light to remove the surface potential of the photoreceptor 40. After the discharging processing, the surface of the photoreceptor 40 is uniformly charged by the charging unit 60, and then subjected to laser writing processing.

As illustrated in FIG. 2, the secondary transfer device 22 is disposed below the belt unit. In the secondary transfer device 22, the endless secondary transfer belt 24 is spanned around the two rollers 23. One of the two rollers 23 acts as a secondary transfer roller that is charged with a secondary transfer bias by a power source (not shown). The intermediate transfer belt 10 and the secondary transfer belt 24 are sandwiched between the secondary transfer roller 23 and the support roller 16 of the belt unit. Thus, the two belts move in the same direction while contacting each other at the contact portion, thereby forming a secondary transfer nip part. Under the influence of a secondary transfer electric field and nip pressure, the four color superposed toner image on the intermediate transfer belt 10 is secondarily transferred onto a transfer sheet that is conveyed from the registration rollers 49 to the secondary transfer nip part, thus forming a full color image. Having passed through the secondary transfer nip part, the transfer sheet is separated from the intermediate transfer belt 10 and carried on the surface of the secondary transfer belt 24 to the fixing device 25. The secondary transfer may be performed by a transfer charger instead of the secondary transfer roller.

After passing through the secondary transfer nip part, the surface of the intermediate transfer belt 10 reaches the support position of the support roller 15. Here, the intermediate transfer belt 10 is interposed between the belt cleaning device 17 which contacts the front surface (outer loop surface) of the transfer belt 10, and the support roller 15 which contacts the rear surface of the transfer belt 10. The residual toner adhered to the front surface is removed by the belt cleaning device 17. Then, the intermediate transfer belt 10 enters the primary transfer nip parts in succession so that next four color toner images are each superimposed thereon.

The belt cleaning device 17 includes two fur brushes 90 and 91 as cleaning members. The fur brushes 90 and 91 each having a diameter of about 20 mm, are formed from a plurality of acrylic carbon filaments filled into a rotary core at a density of about 6.25 [D/F], 100,000[1/inch$^2$], and exhibit an electric resistance of approximately $1\times10^7$ [Ω]. The fur brushes 90 and 91 mechanically scrape off residual toner on the intermediate transfer belt 10 by rotating the plurality of filaments in a direction counter to the filling direction of the filaments while contacting the intermediate transfer belt 10. The scraped residual toner is electrostatically attracted and collected by applying a cleaning bias from a power source (not shown).

Metallic rollers 92 and 93 rotate in a forward direction or reverse direction to the fur brushes 90 and 91 while contacting the fur brushes 90 and 91, respectively. A negative voltage is applied to the metallic roller 92 positioned on the upstream side in the direction of rotation of the intermediate transfer belt 10 by a power source 94. Further, a positive voltage is applied to the metallic roller 93 positioned on the downstream side by a power source 95. The leading edges of blades 96 and 97 contact the metallic rollers 92 and 93, respectively. In this configuration, while the intermediate transfer belt 10 moves in the direction indicated by an arrow in FIG. 2, the fur brush 90 located on the upstream side cleans the surface of the intermediate transfer belt 10. At this time, for example, if −700V is applied to the metallic roller 92 and −400V is applied to the fur brush 90, first the positive polarity toner on the intermediate transfer belt 10 is electrostatically transferred to the fur brush 90. Then, the toner, which has been transferred to the fur brush 90, is transferred to the metallic roller 92 from the fur brush 90 due to the potential difference, and is scraped off by the blade 96.

A lot of toner is left on the intermediate transfer belt 10 even after the fur brush 90 has removed the toner from the intermediate transfer belt 10. This toner is charged with a negative polarity by the negative bias applied to the fur brush 90. This charging is assumed to be performed by charge injection or discharge. Then, the fur brush 91 removes the remaining toner on the intermediate transfer belt 10 by applying a positive bias thereto. The removed toner is transferred to the metallic roller 93 from the fur brush 91 by the potential difference, scrapped off by the blade 97, and collected in a tank (not shown).

Although most of the toner is removed from the surface of the intermediate transfer belt 10 by the cleaning of the fur brush 91, a little amount of toner still remains. The remaining toner on the intermediate transfer belt 10 is charged with a positive polarity by the positive bias applied to the fur brush 91. This toner is transferred toward the photoreceptors 40K, 40Y, 40M, and 40C by a transfer electric field applied at the primary transfer position, and collected by the photoreceptor cleaning device 63.

Although the registration rollers 49 are often grounded, a bias may be applied to the registration rollers 49 to remove paper powders of the transfer sheet. A conductive rubber roller, for example, is used to apply the bias. The roller may have a diameter of about 18 mm, and be covered with conductive NBR rubber having a thickness of about 1 mm. The electric resistance is equivalent to the volume resistivity of the rubber material, approximately $10\times10^9$ [Ω×cm]. A voltage of about −800V is applied to the side (front side) on which toner is transferred. A voltage of about +200V is applied to the rear surface side of the sheet.

Generally, in the intermediate transfer system, paper powders cannot easily move to the photoreceptors. For this reason, the intermediate transfer system may be grounded without taking the transfer of paper powders into consideration greatly. The voltage is generally applied as a DC bias, but may be applied as an AC voltage containing a DC offset component to charge the transfer sheet more evenly. Thus, the sheet surface having passed through the registration rollers 49 applied with a bias in this manner is charged slightly to the negative side. Accordingly, during transfer from the intermediate transfer belt 10 to the transfer sheet, the transfer conditions may vary from those when no voltage is applied to the registration rollers 49.

A transfer sheet reversing device 28 is provided below the secondary transfer device 22 and the fixing device 25 to reverse a transfer sheet for forming images on dual sides of the transfer sheet (i.e., in a dual side copy mode). The transfer sheet reversing device 28 extends in parallel to the tandem image forming section 20.

The above-described image forming apparatus includes an information obtaining device configured to obtain various information related to the state of components of the image forming apparatus and phenomena that occur in the image forming apparatus. The information obtaining device includes a control unit 1, various sensors 2, and an operation display unit 3 illustrated in FIG. 4. The control unit 1 controls the entire image forming apparatus, and includes a read-only memory (ROM) 1*c* acting as an information storage device storing a control program, a random-access memory (RAM) 1*b* acting as an information storage device storing calculation data, control parameters, etc., and a central processing unit (CPU) 1*a* acting as a calculation device. The operation display unit 3 includes a display unit (not shown) constructed by a liquid crystal display for displaying written information, etc., and an operation unit (not shown) for receiving input information from an operator through a numeric keypad or the like, and for transmitting this input information to the control unit 1.

The information obtained by the information obtaining device of the image forming apparatus includes sensing information, control parameter information, input information, image reading information, and so on. This information is described below.

(a) Sensing Information

The items that may be obtained as sensing information include driving relationships, various characteristics of a recording medium, developer characteristics, photoreceptor characteristics, various states of an electrophotographic process, environmental conditions, and various characteristics of recorded objects. An outline of these various types of sensing information is described below.

(a-1) Driving Information Includes:

detecting the rotation speed of a photoreceptor with an encoder, reading the current value of a drive motor, reading the temperature of the drive motor;

similarly detecting the driving condition of cylindrical or belt-shaped rotating components, such as, a fixing roller, a conveyance roller, a drive roller, and so on; and detecting sounds caused by driving with a microphone disposed within or outside of the device.

(a-2) Sheet Conveyance Conditions Include:

reading the position of the leading edge/trailing edge of the conveyed sheet with a transmission type or reflection type optical sensor, or a contact type sensor, detecting the occurrence of a sheet jam, and reading deviations in the passage timing of the leading edge/trailing edge of the sheet, or variation in a direction perpendicular to a sheet conveyance direction;

similarly determining a moving speed of a sheet based on the detection timing of a plurality of sensors; and determining slippage between a sheet feeding roller and a sheet during sheet feeding by comparing a measured value of the number of rotations of the sheet feeding roller to a moving amount of the sheet.

(a-3) Various Characteristics of a Recording Medium Such as a Sheet

This information greatly affects image quality and sheet conveyance stability. The following methods are used to obtain information relating to the type of sheet.

The thickness of a sheet is determined by fixing the sheet between two rollers and detecting relative positional displacement of the rollers with an optical sensor or the like, or detecting an equal displacement to the travel of a member that is pushed upward when the sheet is introduced.

The surface roughness of the sheet is determined by causing a guide or the like to contact the surface of the sheet prior to transfer, and detecting the oscillation, sliding sound, or the like produced by this contact.

The gloss of the sheet is determined by irradiating luminous flux of a prescribed angle of aperture at a prescribed angle of incidence, and measuring the luminous flux of a prescribed angle of aperture that is reflected in a specular reflection direction with a sensor.

The rigidity of the sheet is determined by detecting the amount of deformation (curvature) of a pressed piece of sheet.

A determination as to whether or not the sheet is a recycled sheet is performed by irradiating the sheet with ultraviolet light and detecting its transmittivity.

A determination as to whether or not the sheet is a backing sheet is performed by irradiating the sheet with light from a linear light source such as an LED array, and detecting the light reflected from the transfer surface with a solid state imaging element such as a CCD.

A determination as to whether or not the sheet is an OHP sheet is performed by irradiating the sheet with light, and detecting regular reflection light having a different angle to that of the transmitted light.

The moisture content of the sheet is determined by measuring the absorption of infrared light or μ wave light.

The curl is detected using an optical sensor, contact sensor, or the like.

The electric resistance of the sheet is determined by causing a pair of electrodes (sheet feeding rollers or the like) to contact the recording sheet and measuring the electric resistance directly, or measuring the surface potential of the photoreceptor or intermediate transfer element following transfer, and estimating the resistance value of the recording sheet from the measured value.

(a-4) Developer Characteristics

The characteristic of the developer (toner/carrier) in the device fundamentally affects the electrophotographic process function, and are therefore an important factor in the operation and output of the system. It is beneficial to obtain information regarding developer. The following items may be cited as examples of developer characteristics.

With regard to toner, the charging amount and distribution, fluidity, cohesion, bulk density, electric resistance, external additive amount, consumption amount or remaining amount, fluidity, and toner concentration (mixing ratio of toner and carrier) may be cited as characteristics.

With regard to carrier, the magnetic property, coating thickness, spent amount, and so on may be cited as characteristics.

It is usually difficult to detect items such as those described above individually in the image forming apparatus. Therefore, an overall characteristic of the developer is detected. The overall characteristic of the developer may be measured in the following ways, for example.

A test latent image is formed on the photoreceptor, developed under predetermined developing conditions, and the reflection density (optical reflectance) of the formed toner image is measured.

A pair of electrodes are provided in the developing device, and the relationship between the applied voltage and current (resistance, permittivity, and so on) is measured.

A coil is provided in the developing device, and the voltage-current characteristic (inductance) is measured.

A level sensor is provided in the developing device, and the developer volume is detected. The level sensor may be an optical sensor, a capacitance sensor, or the like.

(a-5) Photoreceptor Characteristics

Similarly to the developer characteristics, the photoreceptor characteristics relate closely to the electrophotographic process function. Examples of information regarding the photoreceptor characteristics include the photosensitive film thickness, the surface characteristics (coefficient of friction, irregularities), surface potential (before and after each process), surface energy, scattered light, temperature, color, surface position (deflection), linear speed, potential attenuation speed, resistance/capacitance, surface moisture content, and so on. From among these examples, the following information can be detected in the image forming apparatus.

Variation in the capacitance accompanying film thickness variation can be detected by detecting the current flowing from a charging member to the photoreceptor, and simultaneously comparing the voltage applied to the charging member with the voltage-current characteristic relating to a preset dielectric thickness of the photoreceptor to determine the film thickness.

The surface potential and temperature can be determined by a known sensor.

The linear speed is detected by an encoder or the like attached to a rotary shaft of the photoreceptor.

Scattered light from the surface of the photoreceptor is detected by an optical sensor.

(a-6) State of the Electrophotographic Process

As is known, toner image formation through electrophotography is performed by a succession of processes including: uniform charging of the photoreceptor; latent image formation (image exposure) by using laser light or the like; development using toner (coloring particles) carrying an electric charge; transfer of the toner image onto a transfer material (in the case of a color image, this is performed by superposing toner images onto an intermediate transfer element or the recording medium, which is the final transfer element, or by superposition development onto the photoreceptor during development); and fixing of the toner image on the recording medium. The various information at each of these stages greatly affects the image and other system output. It is important to obtain the various information to evaluate the stability of the system. Specific examples of obtaining information relating to the state of the electrophotographic process are as follows:

the charging potential and exposure unit potential are detected by a known surface potential sensor;

the gap between the charging member and photoreceptor in non-contact charging is detected by measuring the amount of light passing through the gap;

the electromagnetic wave caused by charging is perceived by a wideband antenna;

the sound generated by charging;

the exposure intensity; and the exposure optical wavelength.

(a-7) Formed Toner Image Characteristics

The following can be cited as methods of obtaining various states of the toner image.

The pile height (height of the toner image) is detected by measuring depth from the vertical direction using a displacement sensor, and measuring shielding length from the horizontal direction using a parallel ray linear sensor.

The toner charging amount is measured by a potential sensor which measures the potential of an electrostatic latent image on a solid portion and the potential when the latent image has been developed, and determined from the ratio thereof to an adhesion amount calculated by a reflection density sensor in the same location.

Dot fluctuation or scattering is determined by detecting a dot pattern image using an infrared light area sensor on the photoreceptor and area sensors of wavelengths corresponding to each color on the intermediate transfer element, and then implementing appropriate processing.

The offset amount (after fixing) is read by optical sensors in locations corresponding to the surface of the recording sheet and the surface of the fixing roller respectively, and determined by comparing the two obtained sensor values.

The remaining transfer amount is determined by disposing optical sensors after the transfer step (on the PD and the belt) and measuring the amount of reflected light from the remaining transfer pattern following the transfer of a specific pattern.

Color unevenness during superposition is detected by a full color sensor which detects the surface of the recording sheet following fixing.

Image density and color are detected optically (by either reflected light or transmitted light; the projection wavelength is selected according to the color). To obtain density and single color information, this detection may be performed on the photoreceptor or intermediate transfer element, but to measure a color combination, such as color unevenness, the detection must be performed on the sheet.

Gradation is determined using an optical sensor by detecting the reflection density of a toner image formed on the photoreceptor or a toner image transferred onto a transfer element at each gradation level.

Definition is detected using a monocular sensor with a small spot diameter or a high resolution line sensor by reading a developed or transferred image to determine a repeated line pattern.

Graininess (roughness) is determined by the same method used to detect the definition, by reading a halftone image and calculating the noise component.

Registration skew is determined by providing an optical sensor at each end of the main scanning direction following registration, and measuring the difference between the ON timing of the registration rollers and the detection timing of the two sensors.

Mis-color registration is determined by detecting the edge portions of a superposed image on the intermediate transfer element or recording sheet using a monocular small-diameter spot sensor or a high resolution line sensor.

Banding (density unevenness in the conveyance direction) is detected by measuring density unevenness in the sub-scanning direction on the transfer sheet using a small-diameter spot sensor or a high resolution line sensor, and measuring the signal quantity at a specific frequency.

Glossiness (unevenness) is detected by providing a piece of a recording sheet formed with a uniform image so as to be scanned by a regular reflection-type optical sensor.

Fogging is detected using a method of reading an image background portion using an optical sensor for scanning a comparatively wide region on the photoreceptor, intermediate transfer element, or recording sheet, or a method of obtaining image information for each area of the background region using a high resolution area sensor, and counting the number of toner particles in the image.

(a-8) Physical Characteristics of Printed Objects in the Image Forming Apparatus Image deletion/fading and so on is determined by scanning a toner image on the photoreceptor, intermediate transfer element, or recording sheet using an area sensor, and subjecting the obtained image information to image processing.

Scattering is determined by scanning an image on the recording sheet using a high resolution line sensor or an area sensor, and calculating the amount of toner scattered around the periphery of the pattern portion.

Rear end blank spots and betacross blank spots are detected with a high resolution line sensor on the photoreceptor, intermediate transfer element, or recording sheet.

Curling, rippling, and folding are detected with a displacement sensor. It is effective to dispose a sensor in a location close to the two end portions of the recording sheet to detect folding.

Contamination and flaws on the cross-cut surface are detected with an area sensor provided vertically in the sheet discharging tray by capturing an image of and analyzing the cross-cut surface when a certain amount of delivered sheets have accumulated.

(a-9) Environmental Conditions

To detect temperature, the following system and elements may be employed: a thermocouple system which extracts as a signal a thermoelectromotive force generated at a contact point joining two different metals or a metal and a semiconductor; a resistivity variation element using temperature-based variation in the resistivity of a metal or semiconductor; a pyroelectric element in which, with a certain type of crystal, the charge in the crystal is polarized with an increase in temperature to generate a surface potential; and a thermomagnetic effect element which detects change in the magnetic property according to temperature.

To detect humidity, an optical measurement method for measuring the optical absorption of $H_2O$ or an OH group, a humidity sensor which measures variation in the electric resistance value of a material due to water vapor adsorption, and so on, may be employed.

Various gases are detected by measuring change in the electric resistance of an oxide semiconductor basically accompanying gas adsorption.

To detect airflow (direction, flow speed, gas type), an optical measurement method or the like may be used, but an air-bridge type flow sensor which enables a reduction in the size of the system due to its small size is particularly useful.

To detect air pressure and pressure, methods such as using a pressure sensitive material to measure the mechanical displacement of a membrane may be employed. Similar methods may be used to detect oscillation.

(b) Control Parameter Information

As an operation of the image forming apparatus is determined by the control unit, it is effective to use the input/output parameters of the control unit directly.

(b-1) Image Formation Parameters

These are direct parameters output as a result of calculation processing performed by the control unit 1 for the purpose of image formation:

Set values of the process conditions set by the control unit 1, for example, the charging potential, developing bias value, and fixing temperature set value;

Similarly, set values of various image processing parameters for halftone processing, color correction, and so on;

Various parameters set by the control unit 1 to operate the device, for example, the sheet conveyance timing, and the execution period of a preparatory mode prior to image formation.

(b-2) User Operating History

The frequency of various operations selected by the user, such as the number of colors, number of sheets, and image quality instructions.

The frequency of sheet size selections by the user.

(b-3) Power Consumption

The total power consumption over the entire period or a specific time unit (one day, one week, one month, etc.), or the distribution, variation (derivative), and cumulative value (integral) thereof.

(b-4) Information Regarding Consumption of Consumables

Usage of the toner, photoreceptor, and sheet over the entire period or a specific time unit (one day, one week, one month, etc.), or the distribution, variation (derivative), and cumulative value (integral) thereof.

(b-5) Information Regarding the Occurrence of a Fault

The frequency with which a fault occurs (by type) over the entire period or a specific time unit (one day, one week, one month, etc.), or the distribution, variation (derivative), and cumulative value (integral) thereof.

(c) Input Image Information

The following information can be obtained from image information transmitted from a host computer as direct data or image information obtained after being read from an original image by a scanner and subjected to image processing.

The cumulative number of color pixels is determined by counting image data by a GRB signal for each pixel.

Using a method such as that described in Japanese Patent Publication No. 2621879, for example, an original image can be divided into characters, halftone dots, photographs, and background, and thus the ratio of the character portion, halftone portion, and so on can be determined. The ratio of colored characters can be determined in a similar manner.

By counting the cumulative value of the color pixels in each of a plurality of regions partitioned in the main-scanning direction, the toner consumption distribution in the main-scanning direction can be determined.

The image size is determined according to image size signals generated by the control unit or the distribution of color pixels in the image data.

The character type (size, font) is determined from attribute data of the characters.

The various information cited above can be obtained by known techniques in a typical image forming apparatus.

Next, an abnormality determining apparatus according to an embodiment of the present invention is described.

First, the basic configuration of the abnormality determining apparatus is described. The abnormality determining apparatus is used to determine the presence of an abnormality in the above-described image forming apparatus acting as a detection subject.

Figure 5:
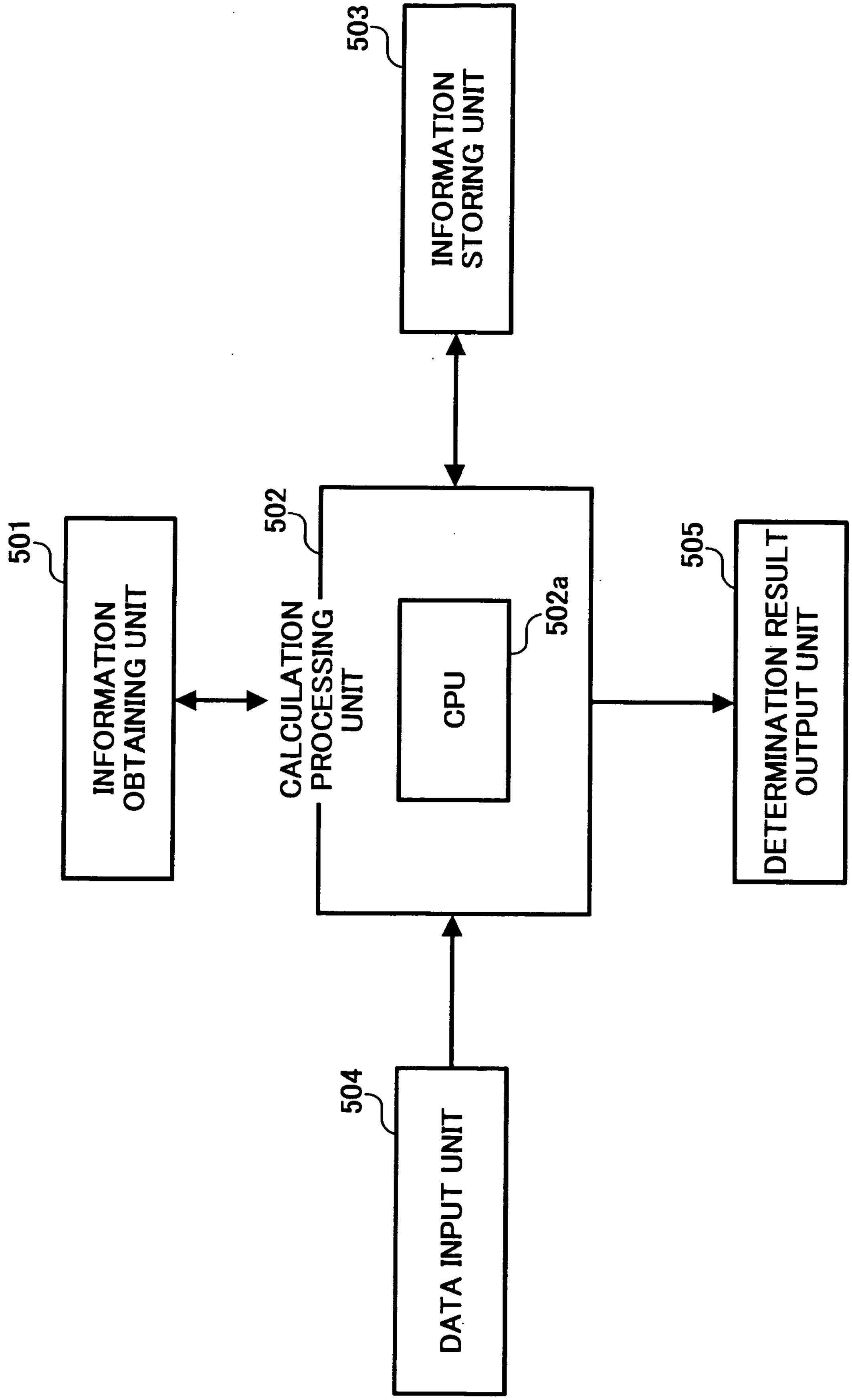
FIG. 5 is a block diagram of main portions of an electric circuit in an abnormality determining apparatus according to the embodiment of the present invention.

FIG. 5 is a block diagram of the main portions of an electric circuit in the abnormality determining apparatus according to the embodiment of the present invention. The abnormality determining apparatus includes an information obtaining unit 501 that obtains information of the image forming apparatus as a detection subject, a calculation processing unit 502 acting as an abnormality determining unit and a normal group data set constructing unit, and an information storing unit 503. The abnormality determining apparatus further includes a data input unit 504, and a determination result output unit 505 that outputs the result of a determination performed by the calculation processing unit 502 acting as the abnormality determining unit.

The information obtaining unit 501 obtains at least two types of information out of the above-described various types of information from the image forming apparatus. The various types of information obtained by the information obtaining unit 501 is transmitted to the calculation processing unit 502. The calculation processing unit 502 includes a calculation unit, for example a CPU 502*a*, to perform various calculations necessary for determining an abnormality. The information transmitted from the information obtaining unit 501 is used as is in the calculation processing for determining an abnormality, or used after being stored in the information storing unit 503. Specifically, the calculation processing unit 502 performs predetermined calculations based on the various information transmitted from the information obtaining unit 501, and determines the presence of an abnormality in the image forming apparatus based on the result of a comparison between the calculation result and a threshold value stored in the information storing unit 503.

The result of the determination performed by the calculation processing unit 502 is output from the determination result output unit 505. This output may be output as characters to be recognized by a user of the image forming apparatus, output as an image display, audio output, and so on, and also includes a mode in which determination result information is output to an external device, such as a personal computer or a printer. By this output, the result of the determination performed by the calculation processing unit 502 is recognized by the user of the image forming apparatus, a remote service person, or the like. The information storing unit 503 may include a RAM, a ROM, and a hard disk, and stores a control program and information such as algorithms, for example, as well as the various information obtained by the information obtaining unit 501.

Next, a characteristic configuration of the abnormality determining apparatus according to the embodiment of the present invention is described. The data input unit 504 receives input data such as "abnormality presence information" (described below) to be stored in the information storing unit 503. In other words, the data input unit 504 acts as an abnormality presence/absence information receiving unit. The "abnormality presence information" received by the data input unit 504 is transmitted to the calculation processing unit 502.

This abnormality determining apparatus may be constituted integrally with the image forming apparatus acting as the detection subject to function as a part of the image forming apparatus, or may be constituted separately from the image forming apparatus to determine the presence of an abnormality based on various information transmitted from the image forming apparatus.

Figure 6:
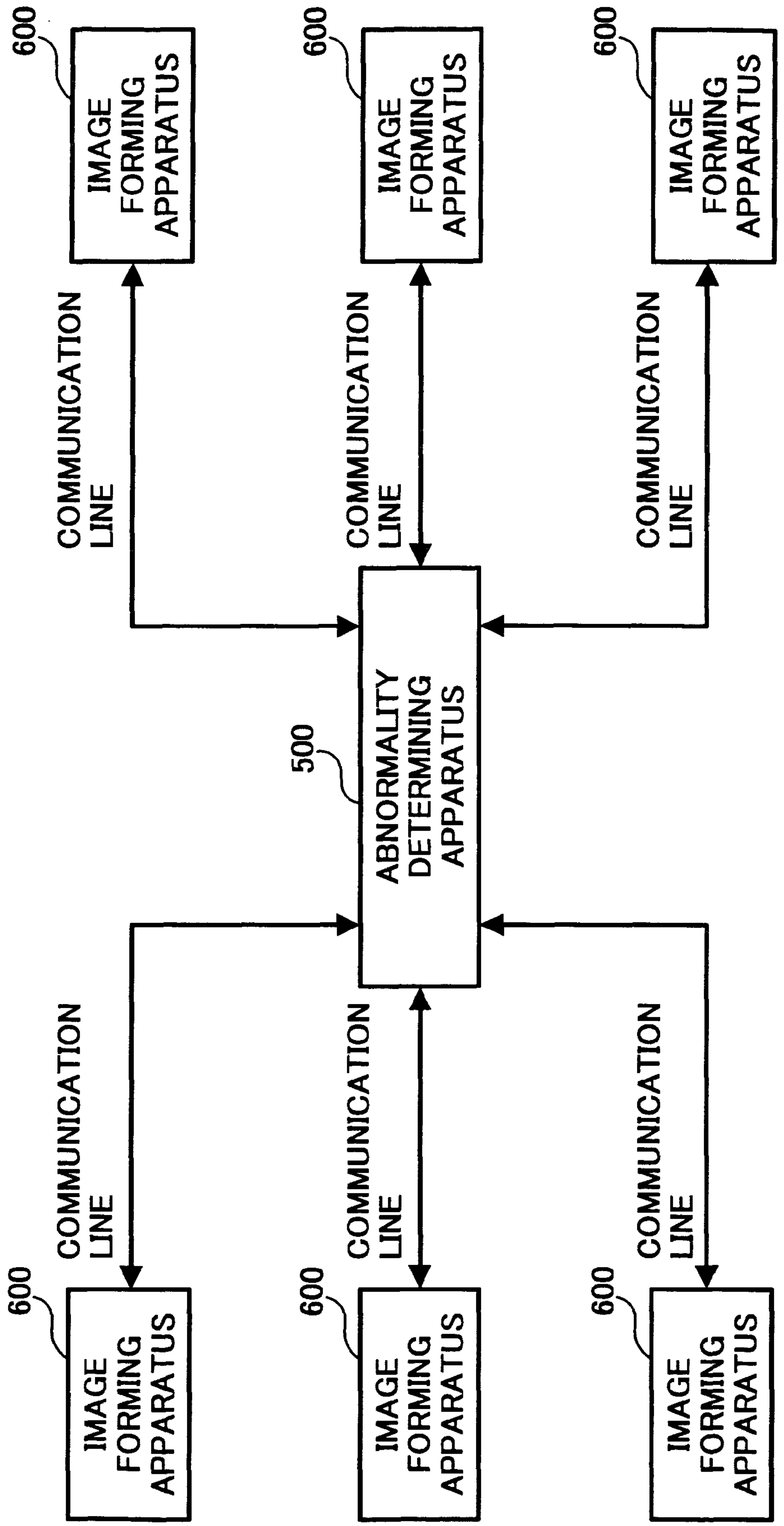
FIG. 6 is a connection diagram illustrating an example in which a plurality of image forming apparatuses are managed collectively by using a remote single abnormality determining apparatus.
Figure 7:
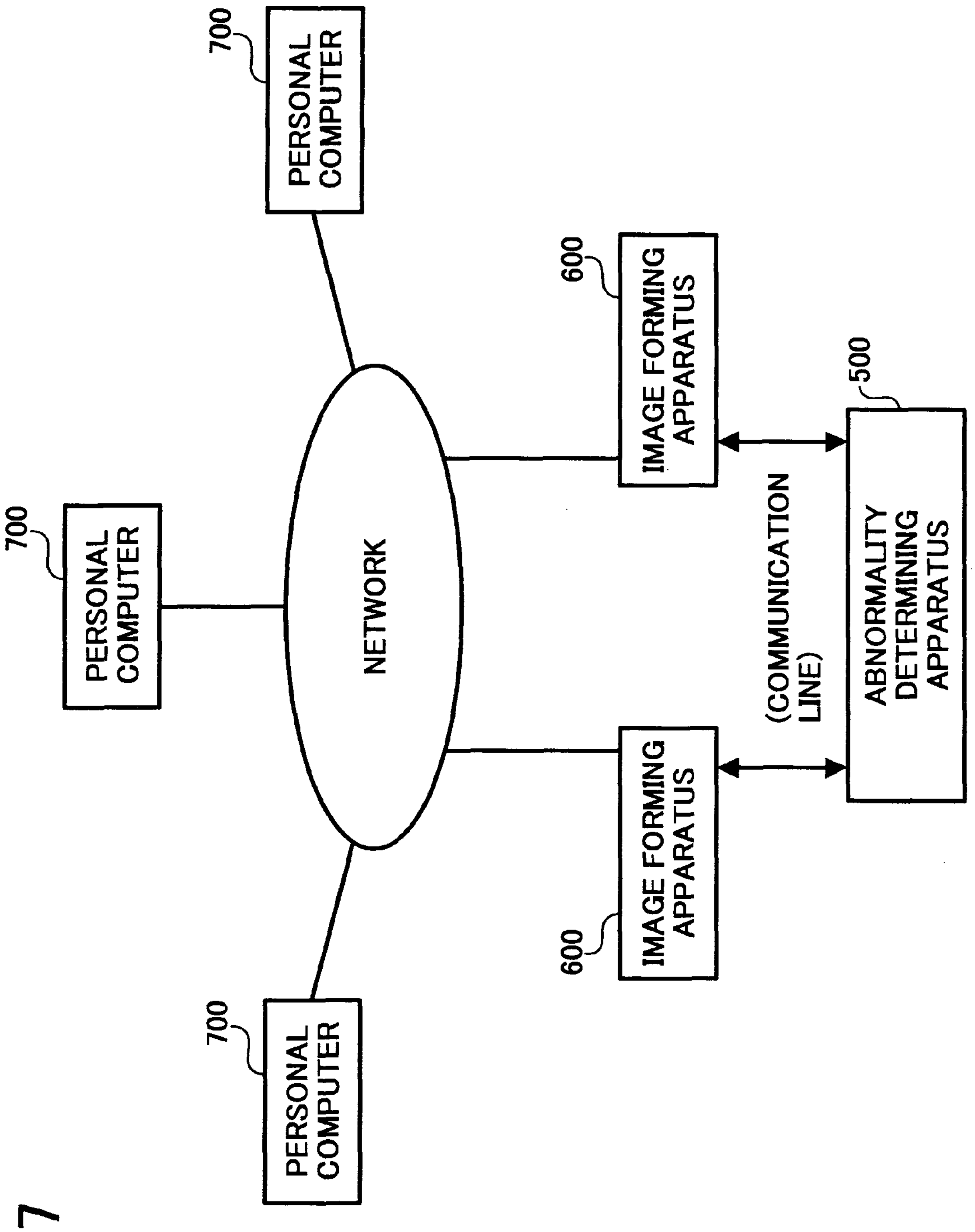
FIG. 7 is a connection diagram illustrating another example in which a plurality of image forming apparatuses connected to a plurality of personal computers on a network are managed collectively with a single abnormality determining apparatus.

If the abnormality determining apparatus is constituted separately from the image forming apparatus, a plurality of image forming apparatuses 600 can be managed collectively by using a remote single abnormality determining apparatus 500 via communication lines as illustrated in FIG. 6. Alternatively, a plurality of image forming apparatuses 600 connected to a plurality of personal computers 700 on a network, such as an in-house LAN, and an intranet, can be managed collectively with a single abnormality determining apparatus 500 via communication lines as illustrated in FIG. 7. In such collective management, if the data input unit 504 is configured to receive input data regarding thresholds transmitted over the communication line, the data regarding the "abnormality presence information" can be input into the abnormality determining apparatus by a user in a remote location. Further, if the determination result output unit 505 is configured to output the determination result over the communication line, the determination result can be transmitted to various image forming apparatuses disposed in different remote locations, and thus respective users are notified of the determination result. The communication lines may be wired or wireless, may use optical fiber as well as electric lines, and may take any form.

Figure 4:
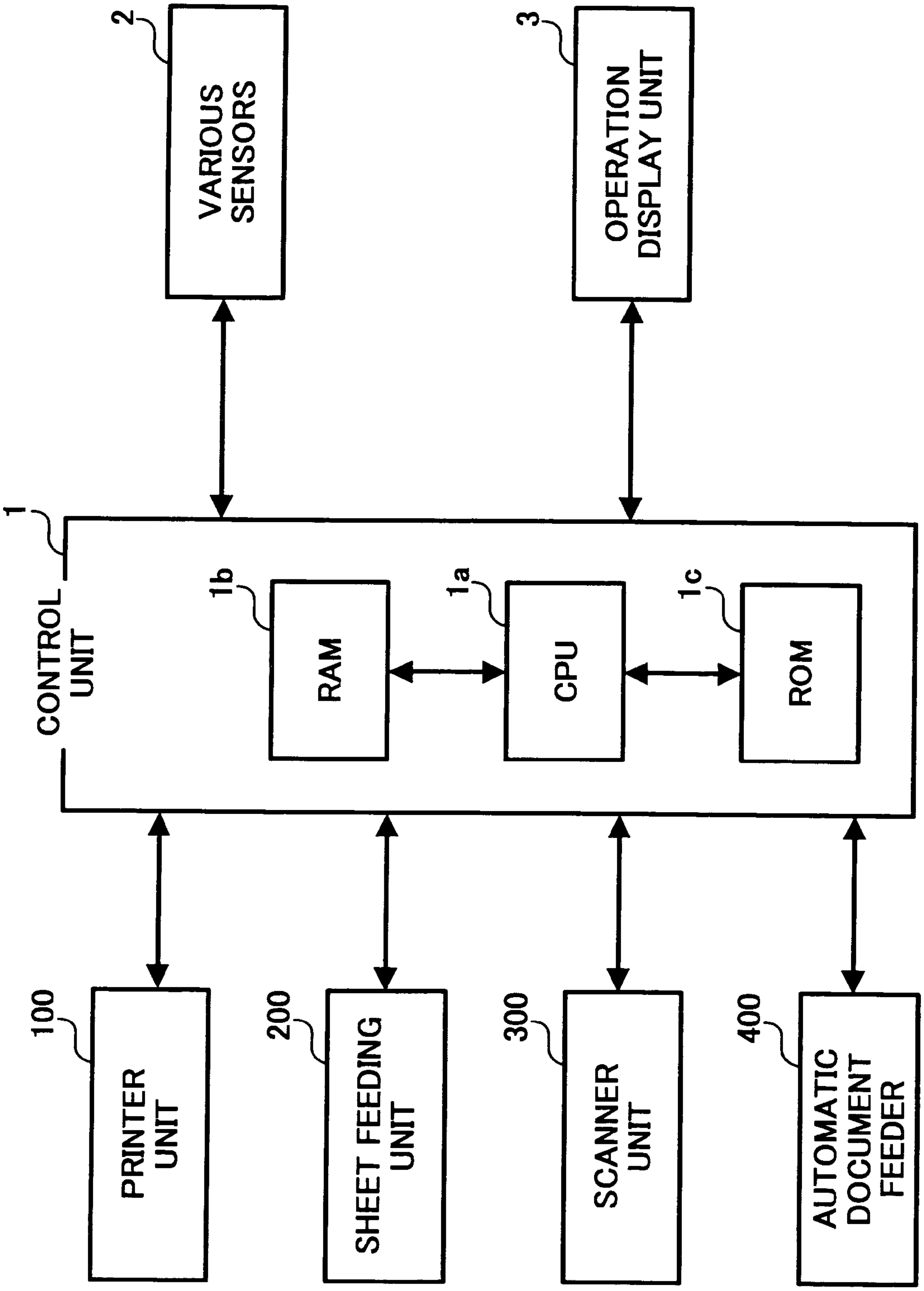
FIG. 4 is a block diagram of a part of an electric circuit in the image forming apparatus of FIG. 1.

If the abnormality determining apparatus is constituted separately from the image forming apparatus, the information obtaining device including the control unit 1, the various sensors 2, and the operation display unit 3 in FIG. 4, does not act as the information obtaining unit 501 of the abnormality determining apparatus. Instead, a receiving device, which receives various information transmitted from the image forming apparatus over the wired or wireless communication lines, acts as the information obtaining unit 501 of the abnormality determining apparatus.

In contrast, if the abnormality determining apparatus is constituted integrally with the image forming apparatus to act as a part of the image forming apparatus, the information obtaining device including the control unit 1, the various sensors 2, and the operation display unit 3 in FIG. 4 acts as the information obtaining unit 501 of the abnormality determining apparatus. In this case, the control unit 1 of the image forming apparatus may be used as the calculation processing unit 502 and the information storing unit 503 in FIG. 5 of the abnormality determining apparatus. Further, the operation display unit 3 of the image forming apparatus may be used as the data input unit 504 and the determination result output unit 505 in FIG. 5 of the abnormality determining apparatus. If the determination result output unit is configured to output determination results via a communication line, a remote maintenance service organization can be notified of an abnormality in the image forming apparatus automatically.

The abnormality determining apparatus determines the presence of abnormality in the image forming apparatus by obtaining a Mahalanobis distance using an MTS method based on grouped information including the various information obtained by the information obtaining unit 501. To achieve this determination, a normal group data set is constructed. After the construction of the normal group data set, the Mahalanobis distance is obtained based on the normal group data set and the grouped information including the various information obtained by the information obtaining unit 501.

To obtain the Mahalanobis distance, the normal group data set and an inverse matrix thereof need to be constructed before determining the presence of an abnormality. FIG. 8 shows an obtained data table used in a normal group data set constructing process performed to construct the normal group data set based on various information obtained from the image forming apparatus in a normal state. The obtained data table of FIG. 8 shows an example in which "n" sets of grouped information including "k" types of information are obtained. The various information obtained in the normal group data set constructing process is not used for determining an abnormality, but used for constructing the normal group data set. The normal group data set is required to have been already constructed as a result of the normal group data set constructing process before determining an abnormality.

The normal group data set constructing process is performed by obtaining a plurality of combinations of the various information as normal grouped information from the image forming apparatus which is operated in a normal state. First, "k" types of information $y_{11}, y_{12} \ldots, y_{1k}$ constituting a first set of grouped information are obtained respectively by the information obtaining device of the image forming apparatus, and stored in the obtained data table of FIG. 8 as data on the first row of the table. Next, "k" types of information $y_{21}$, $y_{22} \ldots, y_{2k}$ constituting a second set of grouped information are obtained respectively by the information obtaining device, and stored in the obtained data table as data on the second row of the table. Then, the third group to the "n"-th set of grouped information is obtained similarly and stored in the obtained data table as data on the third row to the "n"-th row of the table. Finally, the average and standard deviation (σ) of the respective "n" groups are obtained for the "k" types of information constituting each set of grouped information, and stored in the obtained data table as data on the "n"+1 and "n"+2 rows. Thus, the data in the constructed obtained data table is used as the normal group data set that is stored in the information storing unit 503.

After constructing the normal group data set, an information normalization process is performed relative to each data. FIG. 9 shows a normalized data table constructed in this information normalization process. This normalized data table is constructed based on the obtained data table shown in FIG. 8.

Data normalization refers to processing for transforming absolute value information of the various information into variable information. The normalized data of each piece of the various information is calculated based on the following relational expression, $$Y_{ij}=(y_{ij}-\overline{y_j})/\sigma_j \tag{1}$$

where "i" is any one of the "n" sets of grouped information, and "j" is any one of the "k" types of information.

After the information normalization process is completed, a correlation coefficient calculation process is performed. In the correlation coefficient calculation process, a correlation coefficient $r_{pq}$ ($r_{qp}$) is calculated based on the following equation (2) for all possible combinations (kC2 variants) of two different types of the "k" types of normalized data in the "n" groups of normalized data sets.

$$r_{pq} = r_{qp} = \frac{\sum_{i=1}^{n} (Y_{ip} \times Y_{iq})}{\sqrt{\sum_{i=1}^{n} (Y_{ip})^2 \times \sum_{i=1}^{n} (Y_{iq})^2}} \tag{2}$$

After the correlation coefficient $r_{pq}$ ($r_{qp}$) is calculated for all of the combinations and the correlation coefficient calculation process is completed, a correlation coefficient matrix constructing process is performed. In the correlation coefficient matrix constructing process, a k×k correlation coefficient matrix R having 1 as its diagonal element and the correlation coefficient $r_{pq}$ as the remaining elements of the rows "p" and columns "q" is constructed. The content of the correlation coefficient matrix R is shown in the following equation (3).

$$R = \begin{pmatrix} 1 & r_{12} & r_{13} & \ldots & r_{1k} \\ r_{21} & 1 & r_{23} & \ldots & r_{2k} \\ r_{31} & r_{32} & 1 & \ldots & r_{3k} \\ \ldots & \ldots & \ldots & \ldots & \ldots \\ r_{k1} & r_{k2} & r_{k3} & \ldots & 1 \end{pmatrix} \tag{3}$$

After the correlation coefficient matrix constructing process is completed, an inverse matrix constructing process is performed. In the inverse matrix constructing process, the correlation coefficient matrix R shown in the equation (3) is transformed into an inverse matrix A($R^{-1}$) shown in the following equation (4).

$$A = \begin{pmatrix} a_{11} & a_{12} & a_{13} & \ldots & a_{1k} \\ a_{21} & a_{22} & a_{23} & \ldots & a_{2k} \\ a_{31} & a_{32} & a_{33} & \ldots & a_{3k} \\ \ldots & \ldots & \ldots & \ldots & \ldots \\ a_{k1} & a_{k2} & a_{k3} & \ldots & a_{kk} \end{pmatrix} = R^{-1} \tag{4}$$

Figure 10:
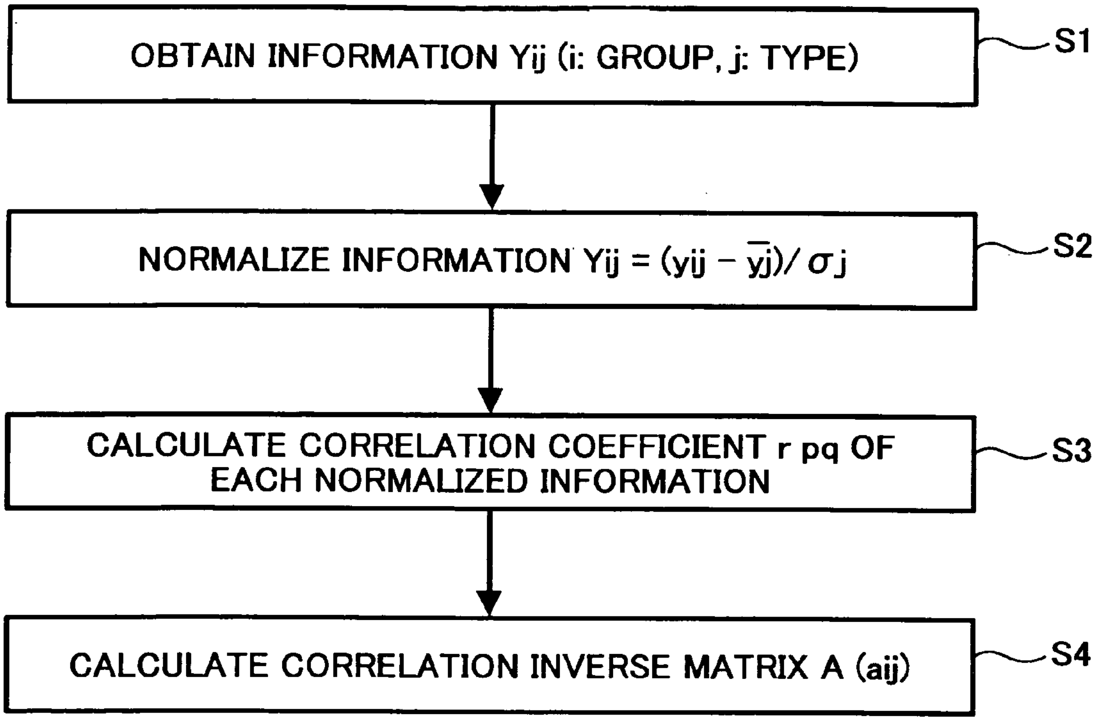
FIG. 10 is a flowchart showing the series of processes from the normal group data set constructing process to an inverse matrix constructing process.

FIG. 10 is a flowchart showing the series of processes from the normal group data set constructing process to the inverse matrix constructing process. In the flowchart, first "n" groups of "k" pieces of information relating to the condition of the image forming apparatus is obtained in step S1. Next, an average value and standard deviation σ are calculated based on the above relational expression (1) for each type (j) of information, and a normalized data table is constructed based on the calculation results in step S2. Subsequently, the correlation coefficient matrix R is constructed based on the normalized data table, that is, the correlation coefficient $r_{pq}$ of each normalized information is calculated in step S3, and is then transformed into the inverse matrix A, that is, the correlation inverse matrix A(aij) is calculated in step S4.

After constructing the inverse matrix A by performing the above-described processes, the presence of an abnormality in the image forming apparatus is determined based on the inverse matrix A and the grouped information obtained by the information obtaining unit 501.

In the abnormality determining process for determining the presence or absence of abnormality in the image forming apparatus, the calculation processing unit 502 calculates the Mahalanobis distance D based on the grouped information obtained by the information obtaining unit 501, the inverse matrix A, and the following equation (5).

$$D^2 = \frac{1}{k}\sum_{p=1}^{k}\sum_{q=1}^{k} a_{pq} Y_p Y_q \tag{5}$$

Figure 11:
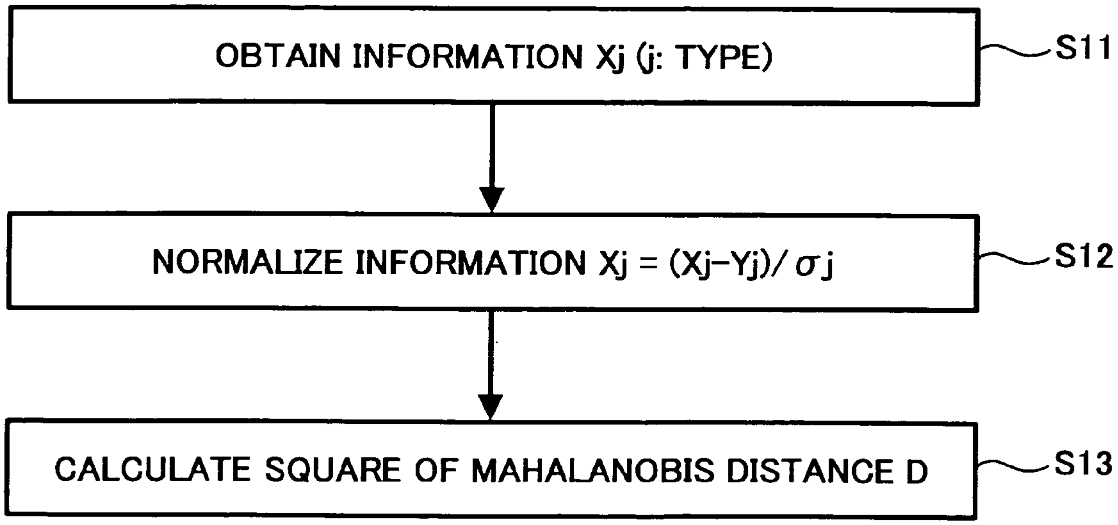
FIG. 11 is a flowchart showing a procedure for calculating a Mahalanobis distance D.

FIG. 11 is a flowchart showing a procedure for calculating the Mahalanobis distance D. In this procedure, first "k" types of data x1, x2, . . . , xk in any condition are obtained in step S11. The data types correspond to y11, y12, . . . , y1*k*, and so on. Next, the obtained data is normalized respectively to X1, X2, . . . , Xk based on the relational expression (1) in step S12.

Then, the square of the Mahalanobis distance D is calculated by using the above-described equation (5) which is determined using the element $a_{kk}$ of the constructed inverse matrix A in step S13.

The calculation processing unit 502 determines the presence or absence of abnormality by comparing the square of the Mahalanobis distance D for the thus obtained grouped information with a predetermined threshold value. As the square of the Mahalanobis distance D increases beyond one (1), the detected data moves further away from a normal state. When the square of the Mahalanobis distance D exceeds the threshold value, it is determined that an abnormality is "present".

In the abnormality determining apparatus according to the embodiment of the present invention, the processes from the normal group data set constructing process to the abnormality determining process are performed at a shipment destination, that is, at the place of a user. Immediately after shipment from a factory, the finished image forming apparatus, which has undergone inspection, is in a normal state. The image forming apparatus is newly finished so that components are not yet worn out. Therefore, the finished image forming apparatus is highly likely to keep in a normal state during a period in which a predetermined time has elapsed since a start of an initial operation of the image forming apparatus at a shipment destination, that is, at the place of a user. For this reason, in the abnormality determining apparatus according to the embodiment of the present invention, the normal group data set constructing process is performed based on the grouped information obtained by the information obtaining unit 501 during a period for a predetermined time from a start of an initial operation of the image forming apparatus. After the predetermined time has elapsed, the inverse matrix A is constructed based on the normal group data set (obtained data table). Then, an abnormality in the image forming apparatus is determined.

However, an image forming apparatus is not always in a normal state during a period for a predetermined time from a start of an initial operation of the image forming apparatus. If an abnormality occurs in the image forming apparatus during such a period, the abnormality is reflected in the grouped information obtained by the information obtaining unit 501. Therefore, such grouped information is not adequate to be used for constructing a normal group data set. If a normal group data set is constructed based on such grouped information, accuracy of abnormality determination is degraded. To prevent the degradation of accuracy of abnormality determination, a normal group data set is constructed based on "abnormality presence information" received by the data input unit 504 as well. The "abnormality presence information" is input to the data input unit 504 by a user's operation. In the abnormality determining apparatus of the present embodiment, a user inputs "abnormality presence information" to the data input unit 504 when the user detects abnormalities, such as significant image quality deterioration, frequent jams, strange sounds, etc., in the image forming apparatus.

Figure 12A:
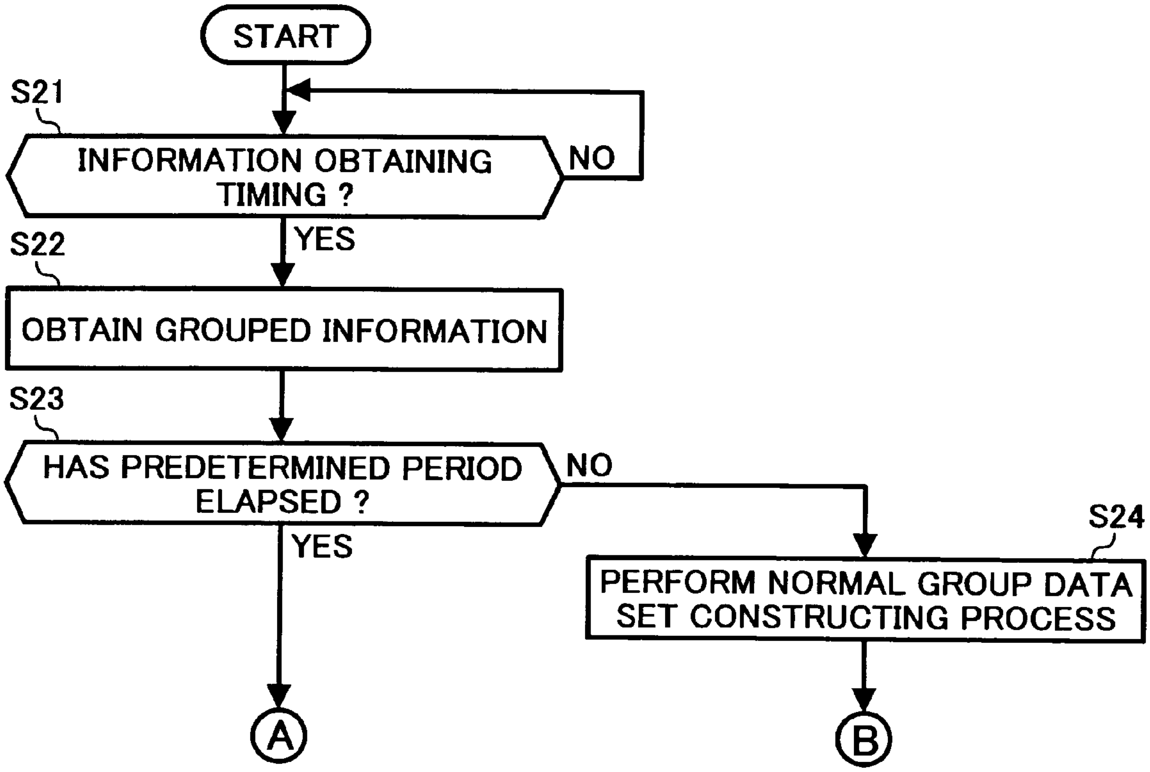
FIGS. 12A and 12B are flowcharts of abnormality determining control operation steps performed by a calculation processing unit of the abnormality determining apparatus according to an embodiment of the present invention.
Figure 12B:
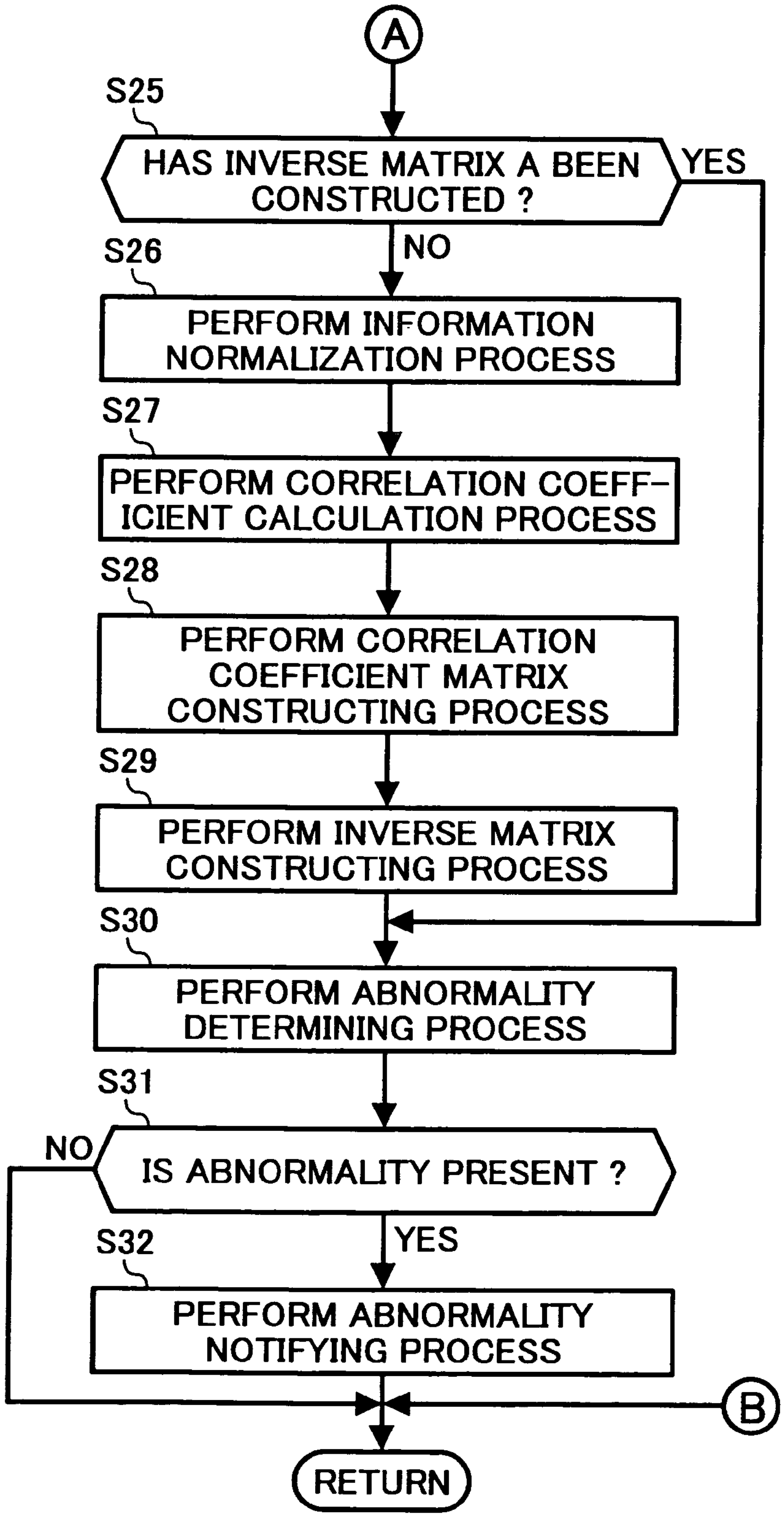

FIGS. 12A and 12B are flowcharts of abnormality determining control operation steps performed by the calculation processing unit 502. First, the CPU 502*a* determines if it is an information obtaining timing in step S21. Specifically, the CPU 502*a* determines if an image forming operation and an original image reading operation have been started in accordance with a print instruction and a copy instruction of the image forming apparatus. If it is not an information obtaining timing in step S21 (the answer is NO), the control operation returns to reexecute step S21. If the answer is YES in step S21, the information obtaining unit 501 obtains grouped information in step S22. Subsequently, the CPU 502*a* determines if a predetermined period has elapsed in step S23. In other words, the CPU 502*a* determines if it is a period in which a normal group data set should be constructed in step S23.

If the answer is NO in step S23, that is, if the CPU 502*a* determines that it is a period in which a normal group data set should be constructed, the above-described normal group data set constructing process is performed in step S24. As a result, the grouped information obtained in step S22 is stored in the above-described obtained data table. After the completion of the normal group data set constructing process, the control operation returns to reexecute step S21.

If the answer is YES in step S23, that is, if the CPU 502*a* determines that it is not a period in which a normal group data set should be constructed, the CPU 502*a* determines if the inverse matrix A has been constructed in step S25. If the answer is YES in step S25, the control operation proceeds to step S30. In step S30, the above-described abnormality determining process is performed. In the abnormality determining process, the calculation processing unit 502 calculates the Mahalanobis distance D based on the constructed inverse matrix A and the grouped information obtained in step S22, and the presence or absence of an abnormality in the image forming apparatus is determined.

If the CPU 502*a* determines that the inverse matrix A has not been constructed in step S25, the above-described information normalization process, correlation coefficient calculation process, correlation coefficient matrix constructing process, and inverse matrix constructing process are performed in steps S26, S27, S28, and S29, respectively. After constructing the inverse matrix A, the abnormality determining process is performed in step S30.

After the completion of the abnormality determining process, the CPU 502*a* determines if an abnormality is present in step S31. If an abnormality is not present in step S31 (the answer is NO), the control operation returns to reexecute step S21. If an abnormality is present in step S31 (the answer is YES), an abnormality notifying process is performed in step S32. In the abnormality notifying process, the CPU 502*a* notifies a user of an occurrence of abnormality by outputting character information, image information, audio information, etc., from the determination result output unit 505. Alternatively, the CPU 502*a* may notify a maintenance service organization of an occurrence of abnormality via a communication line. The notified maintenance service organization can then send a service person to a user to repair an image forming apparatus.

With regard to the above-described predetermined period in step S23 in FIG. 12A, the predetermined period is preferably set to a period less than a period from when an initial operation of the image forming apparatus starts to when abnormalities rapidly occur in the image forming apparatus. However, if it is set to a very short period, it cannot construct normal group data sets that correspond to various usage conditions and modes of the image forming apparatus. For example, the use environmental conditions of the image forming apparatus vary through all seasons. Therefore, it is desirable to construct normal group data sets based on the operations of the image forming apparatus throughout the year.

Figure 13:
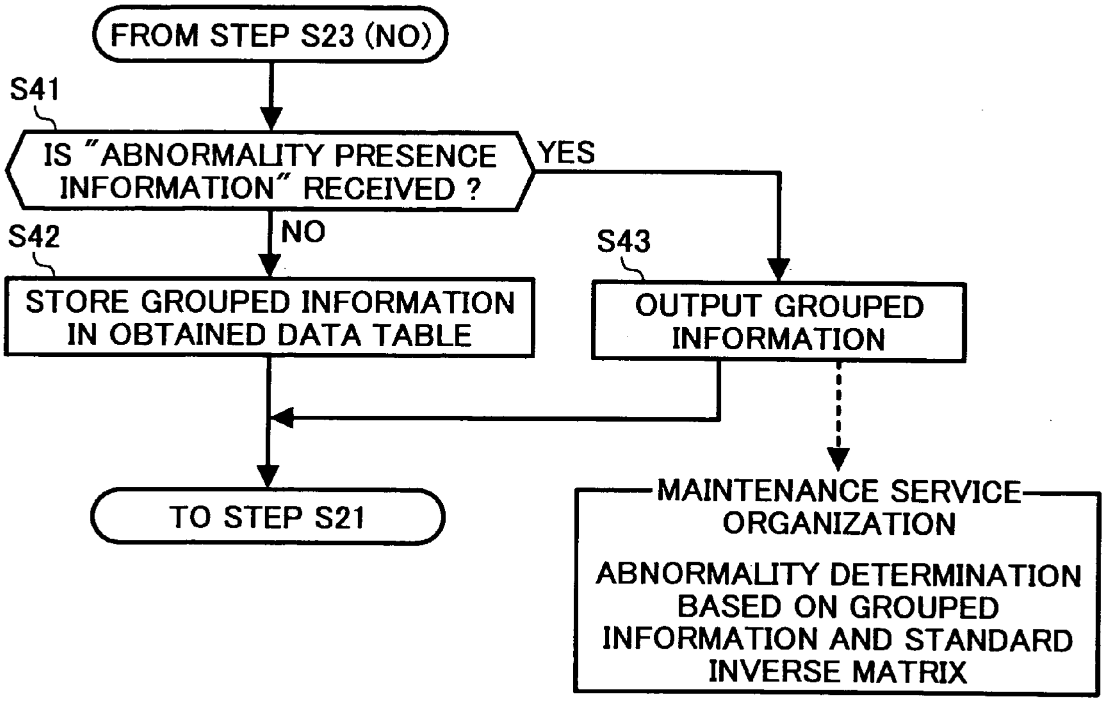
FIG. 13 is a flowchart of detail control operation steps in the normal group data set constructing process in the flowchart of FIG. 12A.

FIG. 13 is a flowchart of detail control operation steps in the normal group data set constructing process in the flowchart of FIG. 12A. In the normal group data set constructing process, the CPU 502*a* determines if "abnormality presence information" is received by the data input unit 504 in step S41. If a user senses a strange sound during a period of a printing operation including an original image reading operation or perceives significant deterioration of quality of printed image, the "abnormality presence information" is input to the data input unit 504. If the "abnormality presence information" is not received by the data input unit 504 in step S41 (the answer is NO), the grouped information obtained in step S22 in FIG. 12A is stored in the above-described obtained data table, and a normal group data set is constructed in step S42. Then, the control operation returns to reexecute step S21 in FIG. 12A.

If the "abnormality presence information" is received by the data input unit 504 in step S41 (the answer is YES), the grouped information obtained in step S22 in FIG. 12A is output in step S43. Then, the control operation returns to reexecute step S21 in FIG. 12A. In step S43, for example, the grouped information is output by printing out character information or by transmitting the information to a maintenance service organization via a communication line. The maintenance service organization determines the presence of an abnormality in the image forming apparatus based on the grouped information transmitted from a user via a communication line, etc., and a standard inverse matrix constructed by making test runs of a normal standard machine of an image forming apparatus.

In the above-described abnormality determining apparatus, a normal group data set of an image forming apparatus can be automatically constructed at a place of each user. Further, a normal group data set can be constructed by excluding the grouped information obtained from the image forming apparatus in which abnormalities are detected by a user. Therefore, a normal group data set can be automatically constructed for each product at a place of each user while eliminating complicated operations such that a test run is made on each of image forming apparatuses before shipping the apparatuses from a factory. Thus, the presence or absence of abnormality can be accurately determined in each image forming apparatus without performing complicated operations before shipping the image forming apparatus from a factory.

Even if a slight abnormality occurs in the image forming apparatus, when a user does not sense it as an abnormality, the grouped information obtained when the slight abnormality occurs can be used as normal data for constructing a normal group data set. With this normal group data set construction, an abnormality determination can be performed according to the degree of user's perception of abnormality of the image forming apparatus. Thus, an occurrence of abnormality can be detected at an appropriate timing for each user.

Further, as compared to a case in which a common normal group data set is used for each image forming apparatus shipped from a factory, the degradation of accuracy of abnormality determination caused by precision errors and attachment errors in the components of the apparatus can be prevented by constructing a unique normal group data set for each image forming apparatus.

In the abnormality determining apparatus of the present embodiment, information is input to the data input unit 504 only when a user detects an abnormality. Specifically, only the above-described "abnormality presence information" indicative of a perception of abnormality is input to the data input unit 504 as abnormality presence/absence information. Alternatively, both "abnormality presence information" and "abnormality absence information" may be input to the data input unit 504. However, in this case, a user needs to input information about whether the user perceives abnormality or not to the data input unit 504 every time grouped information is obtained by the information obtaining unit 501, resulting in significant deterioration of operability. Therefore, such deterioration of operability can be prevented by receiving only "abnormality presence information" by the data input unit 504. If the data input unit 504 does not receive any information, it is regarded as "abnormality absence information", that is, no abnormality is perceived.

Figure 14:
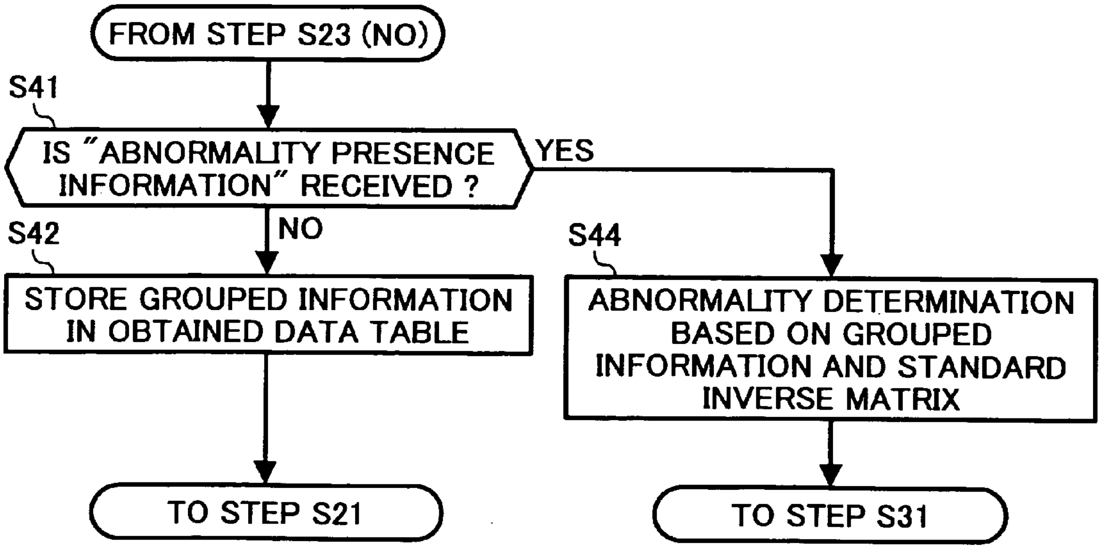
FIG. 14 is a flowchart of control operation steps in the normal group data set constructing process in the flowchart of FIG. 12A according to another embodiment of the present invention.

As described above, if the "abnormality presence information" is received by the data input unit 504 in step S41 of FIG. 13, the grouped information obtained by the information obtaining unit 501 is output, and a service person or an external device in the maintenance service organization, for example, determines an abnormality. Alternatively, the calculation processing unit 502 may determine an abnormality based on the grouped information obtained by the information obtaining unit 501. FIG. 14 is a flowchart of control operation steps in the normal group data set constructing process in the flowchart of FIG. 12A according to another embodiment of the present invention. In this embodiment, a standard inverse matrix A is prestored in the information storing unit 503 of the abnormality determining apparatus. If the "abnormality presence information" is received by the data input unit 504 in step S41 (the answer is YES), the calculation processing unit 502 determines the presence of an abnormality in the image forming apparatus in step S44 based on the standard inverse matrix A stored in the information storing unit 503 and the grouped information obtained in step S22 in FIG. 12A. Then, the control operation proceeds to step S31 in FIG. 12B. Then, a user or an external device, for example, is notified of an occurrence of abnormality determined by the calculation processing unit 502.

As described above, the CPU 502*a* determines if a predetermined period has elapsed in step S23 in FIG. 12A. For example, the predetermined period in step S23 in FIG. 12A is a time period in which a predetermined time has elapsed since a start of an initial operation of the image forming apparatus. Examples of the predetermined time are 8,760 hours (24 hours×365 days), 4,320 hours (24 hours×30 days×6), etc. In this example, a normal group data set can be constructed by reflecting an environmental variation during a period in which the set time has elapsed in the normal group data set.

As another example, the predetermined period in step S23 in FIG. 12A may be a time period from when the initial operation of the image forming apparatus starts to when an accumulated number of printing operations of the image forming apparatus reaches a predetermined number. In this example, the grouped information obtained in a period until the set number of printing operations is counted can be completely reflected in the normal group data set regardless of frequency of use of the image forming apparatus. Thus, the decrease of determination accuracy caused by the shortage of a number of grouped information used for constructing the normal group data set can be prevented.

The abnormality determining apparatus may use a receiving device as the data input unit 504 to receive a signal indicative of the abnormality presence/absence information transmitted from an external device such as a personal computer via communication lines. The abnormality presence information is input to the abnormality determining apparatus through the receiving device from a personal computer located at a position away from the abnormality determining apparatus. For example, this configuration is effective when an image forming apparatus is shared among a plurality of personal computers as illustrated in FIG. 7. Further, when grouped information is sorted based on user information (described below), the user information can be obtained automatically from each personal computer.

If one image forming apparatus as a detection subject is commonly used by a plurality of users, the perception of normality and abnormality of the image forming apparatus varies among the users. For example, one user, who prefers a low-density image, perceives an image as an abnormal image when an image having relatively high density is output from the image forming apparatus. In contrast, another user, who prefers a high-density image, perceives an image as a normal image when an image having relatively high density is output from the image forming apparatus. As such, even though the image forming apparatus is in the same state, the perception of abnormality of the image forming apparatus varies among the users. Further, the perception of abnormality varies depending on the type of job and specialty of the users.

If one normal group data set is constructed while receiving "abnormality presence information" from a plurality of users having different abnormality perception, the following problem arises. Assuming that the obtained information (grouped information), which is perceived as a normal state by one user and as an abnormal state by another user, is incorporated into a normal group data set as normal data, one user is notified of abnormality even if the user does not perceive abnormality or the another user is not notified of abnormality even if the user perceives abnormality.

To solve this problem, the abnormality determining apparatus of the present embodiment includes a user information receiving device that receives individual information of a user. The calculation processing unit 502 is configured to construct the normal group data set distinguished by the individual information. That is, an exclusive normal group data set is constructed for each user. As such, a normal group data set is adequately constructed for each individual or group, and each individual or group can be notified of an abnormality at an appropriate timing.

The user information receiving device may receive group information instead of individual information. In this case, the calculation processing unit 502 may be configured to construct the normal group data set distinguished by the group information. Examples of the group information include a designing section user, a production section user, a sales section user, and an administration section user. As such, a normal group data set is adequately constructed for each user group sharing a common type of job and specialty, and each user group can be notified of an abnormality at an appropriate timing.

The data input unit 504 may be used as the user information receiving device, or the user information receiving device may be provided independently of the data input unit 504. Input buttons, a user information reading device, or a receiving device that receives specific individual information, such as, for example, personal computer addresses, may act as the user information receiving device.

In the case of using the input buttons as the user information receiving device, user information needs to be input with the input buttons relative to each user or user group every time an image forming apparatus is operated. This is because a correspondence between grouped information obtained from the image forming apparatus and a user/user group needs to be recognized. Accordingly, it is desirable that a user be notified that user information needs to be input after the manipulation of the image forming apparatus.

In some sections using image forming apparatuses, a usage record storing device such as a magnetic card is used by each user or group to recognize the status of use of the image forming apparatus. The image forming apparatus is configured not to be operated unless a user inserts the usage record storing device into the image forming apparatus. In this case, the user information recorded in the usage record storing device is read by the image forming apparatus, and the reading result of the image forming apparatus is received with the user information receiving device. The user information receiving device may receive a signal indicative of user information transmitted from an external device, such as a personal computer, and a remote image forming apparatus, via communication lines. As such, user information can be automatically input to the abnormality determining apparatus for each user without the inconvenience of inputting the user information.

Examples of a user information reading device acting as the user information receiving device include a device for reading electronic information recorded in an identification (ID) card owned by each user or user group. The user information reading device may read a finger print of a user. Similarly to the input buttons, it is desirable that a user be notified that user information needs to be input after the manipulation of the image forming apparatus.

Figure 15:
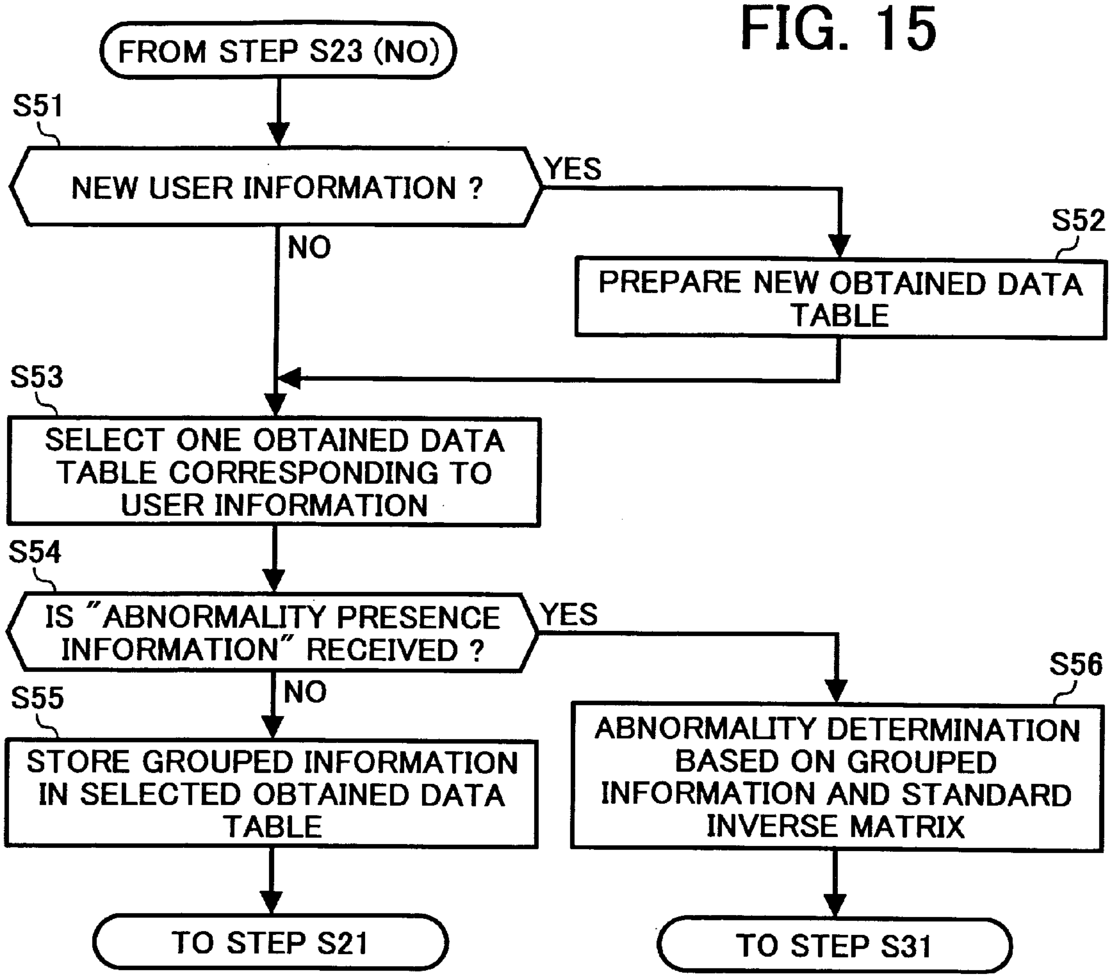
FIG. 15 is a flowchart of control operation steps in a normal group data set constructing process performed by the calculation processing unit of the abnormality determining apparatus according to another embodiment of the present invention.

FIG. 15 is a flowchart of control operation steps in a normal group data set constructing process performed by the calculation processing unit 502 of the abnormality determining apparatus according to another embodiment of the present invention. In step S51, the CPU 502*a* determines if user information input by a user is new user information. If the user information is not new user information in step 551 (the answer is NO), one obtained data table which corresponds to the user information is selected from a plurality of obtained data tables which have been prepared by each user information in step S53. If the user information is new information in step S51 (the answer is YES), an obtained data table corresponding to the new user information is newly prepared in step S52. Then, the control operation proceeds to step S53 in which the obtained data table which corresponds to the new user information input by the user in step S51 is selected from the plurality of obtained data tables. Next, the CPU 502*a* determines if "abnormality presence information" is received by the data input unit 504 in step S54. If the "abnormality presence information" is not received by the data input unit 504 in step S54 (the answer is NO), in step S55 the grouped information obtained in step S22 in FIG. 12A is stored in the obtained data table selected in step S53. Then, the control operation returns to reexecute step S21 in FIG. 12A.

If the "abnormality presence information" is received by the data input unit 504 in step S54 (the answer is YES), the calculation processing unit 502 determines the presence of an abnormality in the image forming apparatus in step S56 based on the standard inverse matrix A stored in the information storing unit 503 and the grouped information obtained in step S22 in FIG. 12A. Then, the control operation proceeds to step S31 in FIG. 12B.

Figure 16:
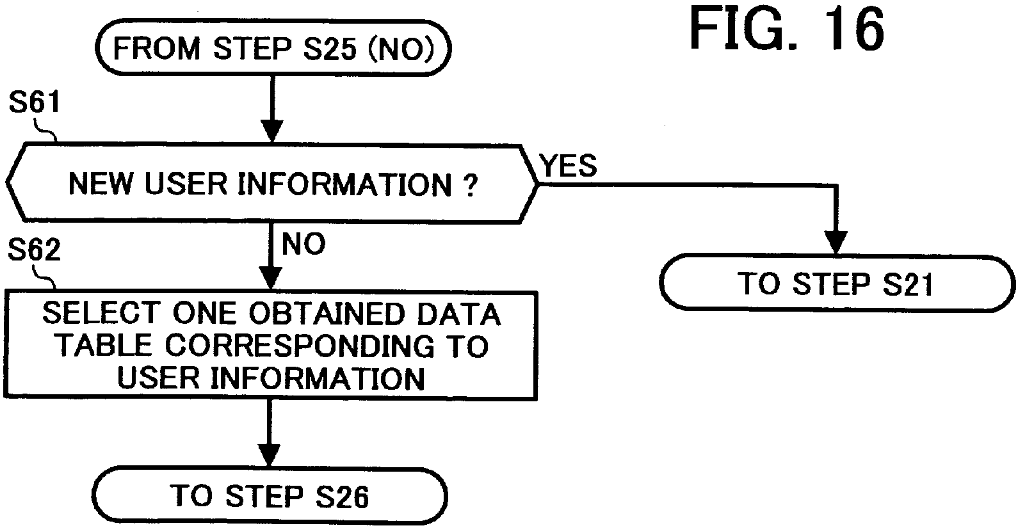
FIG. 16 is a flowchart of control operation steps in an inverse matrix construction preparation process performed by the calculation processing unit of the abnormality determining apparatus according to another embodiment of the present invention.

FIG. 16 is a flowchart of control operation steps in an inverse matrix construction preparation process performed by the calculation processing unit 502 of the abnormality determining apparatus. The inverse matrix construction preparation process is performed between steps S25 and S26 in FIG. 12B. If the CPU 502*a* determines that the inverse matrix A has not been constructed in step S25 (the answer is NO) in FIG. 12B, the CPU 502*a* determines if user information input by a user is new user information in step S61. If the answer is YES in step S61, a normal group data set corresponding to the user information has not been constructed, and there is no period for constructing it newly. Therefore, in this case, the control operation returns to reexecute step S21 in FIG. 12A without performing an abnormality determination. If the user information is not new user information in step S61 (the answer is NO), one obtained data table which corresponds to the user information input by the user in step S61 is selected from a plurality of obtained data tables which have been prepared by each user information in step S62. Subsequently, the control operation proceeds to step S26 in FIG. 12B, and then an inverse matrix corresponding to the user information is newly constructed.

Figure 17:
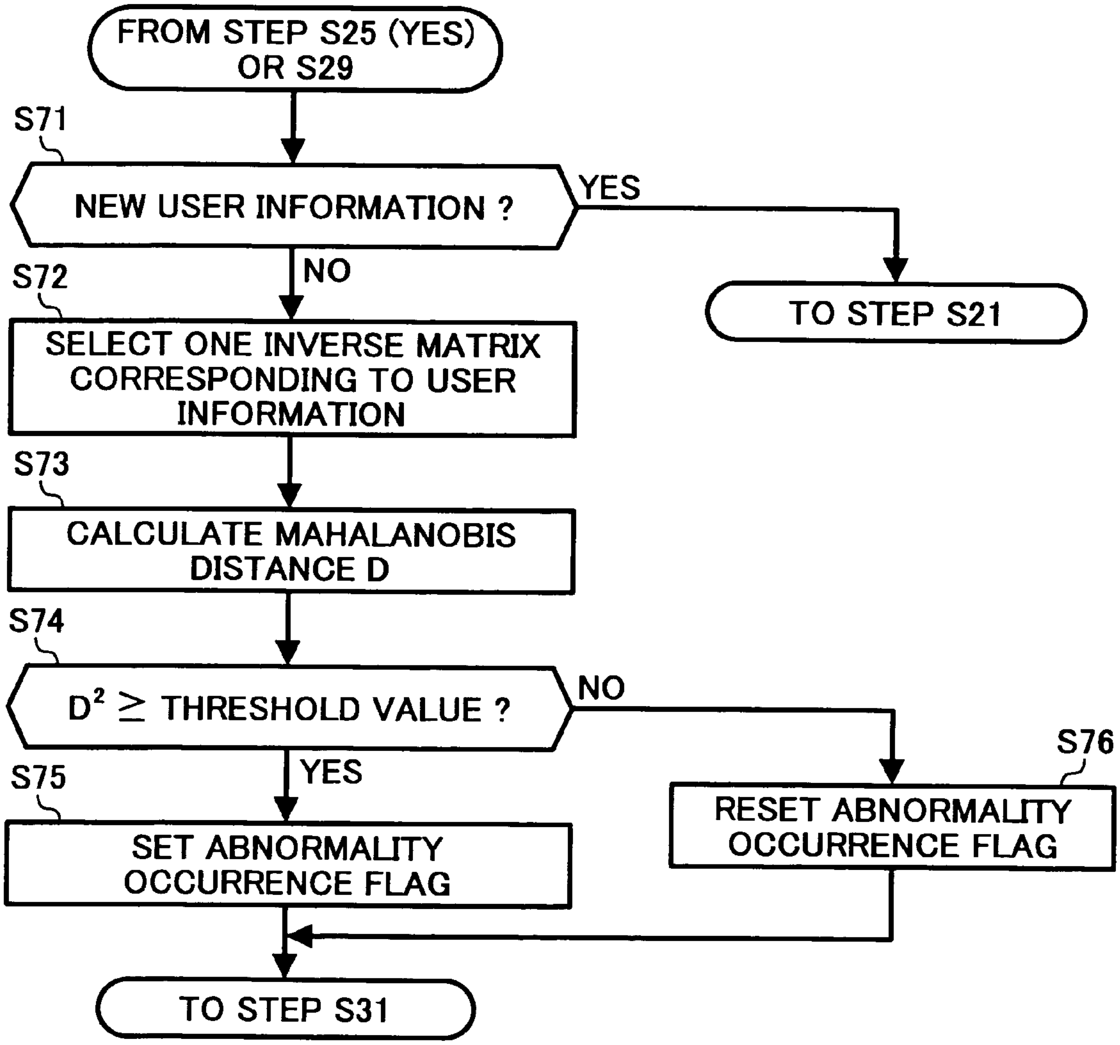
FIG. 17 is a flowchart of control operation steps in an abnormality determining process performed by the calculation processing unit of the abnormality determining apparatus according to another embodiment of the present invention.

FIG. 17 is a flowchart of control operation steps in an abnormality determining process performed by the calculation processing unit 502 of the abnormality determining apparatus. First, the CPU 502*a* determines if user information input by a user is new user information in step S71. If the answer is YES in step S71, an inverse matrix corresponding to the new user information does not exist, and an abnormality determining process cannot be performed. Therefore, in this case, the control operation returns to reexecute step S21 in FIG. 12A without performing an abnormality determination. If the user information is not new user information in step S71 (the answer is NO), one inverse matrix A which corresponds to the user information input by the user in step S71 is selected from a plurality of inverse matrixes which have been constructed by each user information, in step S72. Subsequently, in step S73, the Mahalanobis distance D is calculated based on the inverse matrix A selected in step S72 and the grouped information obtained in step S22 in FIG. 12A. Then, the CPU 502*a* determines if the square of the Mahalanobis distance D is equal to or greater than a threshold value in step S74. If the answer is YES in step S74, an abnormality occurrence flag is set in step S75. Then, the control operation proceeds to step S31 in FIG. 12B, and a user or a service person, for example, is notified of occurrence of an abnormality. If the answer is NO in step S74, an abnormality occurrence flag is reset in step S76. Then, the control operation proceeds to step S31 in FIG. 12B, and returns to reexecute step S21 in FIG. 12A without notifying a user or a service person, for example, of occurrence of an abnormality.

In the above-described abnormality determining apparatus, the abnormality determining process for the image forming apparatus is performed by selecting the inverse matrix A which corresponds to each user or user group. Thus, an occurrence of abnormality can be notified to each user or user group at an appropriate timing.

An image forming apparatus is used under various image forming conditions, such as, for example, an output image density condition, and a sheet type condition. The degree of perception of abnormality of the image forming apparatus varies depending on the image forming conditions. For example, a blank image (some portions of an image are dropped) is easily perceived when the output image density is set to a high density rather than a middle density. Further, an image fixing failure is easily perceived when a sheet type is set to a thick sheet rather than a sheet having a standard thickness. Moreover, a background fouling caused by the supply of a large amount of toner is easily perceived under the image forming condition for continuously outputting images having a large number of image pixels.

If one normal group data set is constructed while receiving "abnormality presence information" under a plurality of image forming conditions resulting in various degrees of abnormality perception, the following problem arises. Assuming that grouped information obtained under an image forming condition resulting in a low degree of abnormality perception is incorporated into a normal group data set, an abnormality may not be adequately detected under an image forming condition resulting in a high degree of abnormality perception.

To solve this problem, the abnormality determining apparatus of the present embodiment includes an image forming condition obtaining device (the information obtaining unit 501) that obtains an image forming condition of the image forming apparatus. The calculation processing unit 502 is configured to construct the normal group data set distinguished by the image forming condition. A receiving device that receives a signal indicative of an image forming condition transmitted from the image forming apparatus or a personal computer that transmits an image information signal to the image forming apparatus may be used as the image forming condition obtaining device. As such, image forming condition information can be automatically input to the abnormality determining apparatus without the inconvenience of inputting the image forming condition information.

Figure 18:
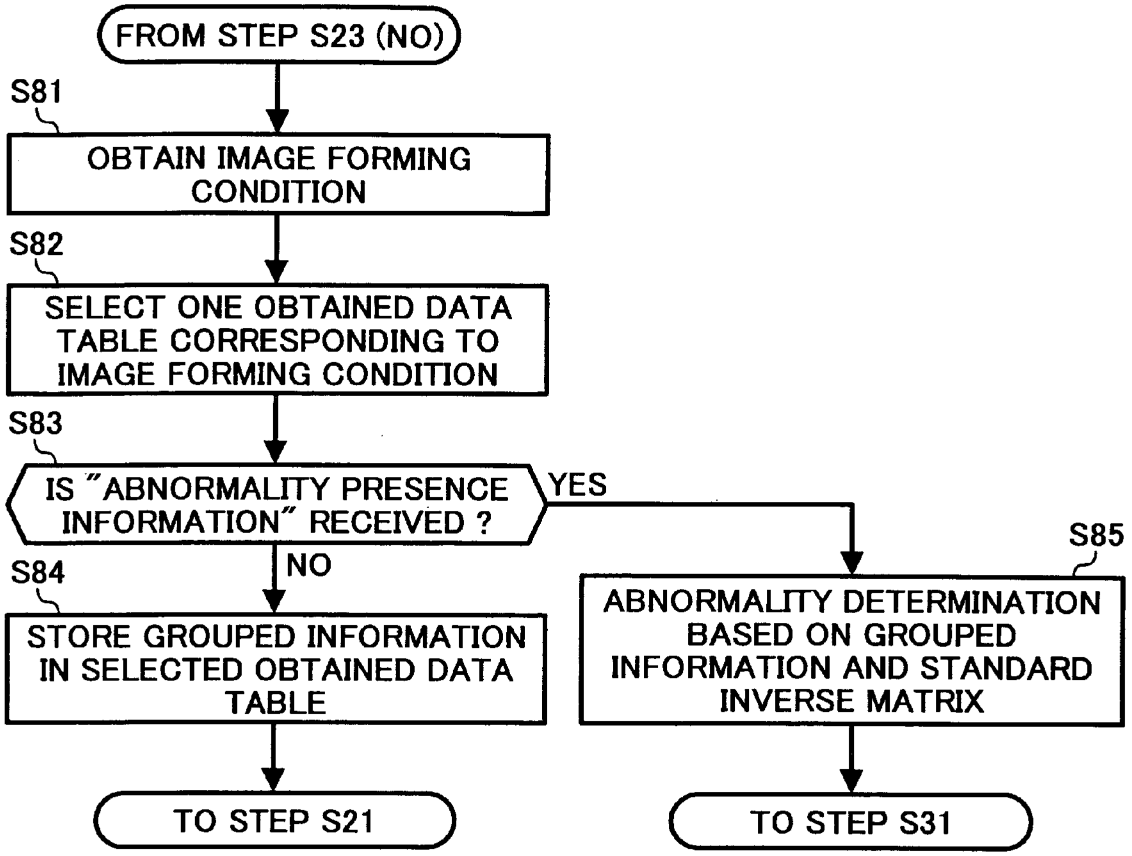
FIG. 18 is a flowchart of control operation steps in a normal group data set constructing process performed by the calculation processing unit of the abnormality determining apparatus according to another embodiment of the present invention.

FIG. 18 is a flowchart of control operation steps in a normal group data set constructing process performed by the calculation processing unit 502 of the abnormality determining apparatus according to another embodiment of the present invention. In step S81, the image forming condition obtaining device obtains an image forming condition. Subsequently, one obtained data table which corresponds to the image forming condition obtained in step S81 is selected from a plurality of obtained data tables which have been prepared by each image forming condition, in step S82. Then, the CPU 502*a* determines if "abnormality presence information" is received by the data input unit 504 in step S83. If the "abnormality presence information" is not received by the data input unit 504 in step S83 (the answer is NO), in step S84, the grouped information obtained in step S22 in FIG. 12A is stored in the obtained data table selected in step S82. Then, the control operation returns to reexecute step S21 in FIG. 12A.

If the "abnormality presence information" is received by the data input unit 504 in step S83 (the answer is YES), an abnormality determining process is performed based on the grouped information obtained in step S22 in FIG. 12A and the standard inverse matrix A stored in the information storing unit 503 in step S85. Then, the control operation proceeds to step S31 in FIG. 12B, and a user or a service person, for example, is notified of occurrence of an abnormality.

Figure 19:
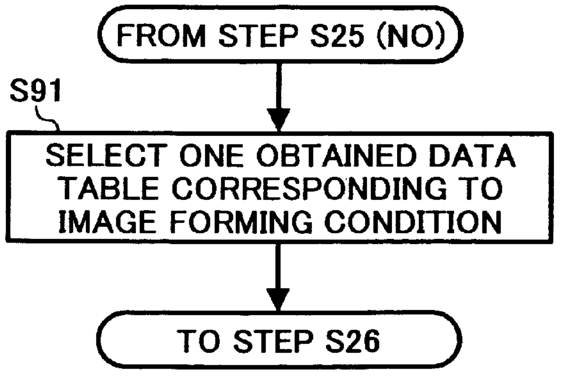
FIG. 19 is a flowchart of control operation steps in an inverse matrix constructing preparation process performed by the calculation processing unit of the abnormality determining apparatus according to another embodiment of the present invention.

FIG. 19 is a flowchart of control operation steps in an inverse matrix constructing preparation process performed by the calculation processing unit 502 of the abnormality determining apparatus. The inverse matrix constructing preparation process is performed between steps S25 and S26 in FIG. 12B. If the CPU 502*a* determines that the inverse matrix A has not been constructed in step S25 (the answer is NO) in FIG. 12B, one obtained data table which corresponds to the image forming condition obtained by the image forming condition obtaining device in step S81 in FIG. 18 is selected from a plurality of obtained data tables which have been prepared by each image forming condition, in step S91. Subsequently, the control operation proceeds to step S26 in FIG. 12B, and an inverse matrix A corresponding to the image forming condition is constructed in steps S26 through S29 in FIG. 12B. Then, although a flowchart is omitted, the control operation returns to step S91 in FIG. 19 to select the second obtained data table which corresponds to another image forming condition. Then, an inverse matrix A corresponding to the second image forming condition is constructed in steps S26 through S29 in FIG. 12B. A sequence (from step S91 in FIG. 19 to steps S26 through S29 in FIG. 12B and to step S91 in FIG. 19) is repeated until all the inverse matrixes A corresponding to all the preset image forming conditions are constructed.

Figure 20:
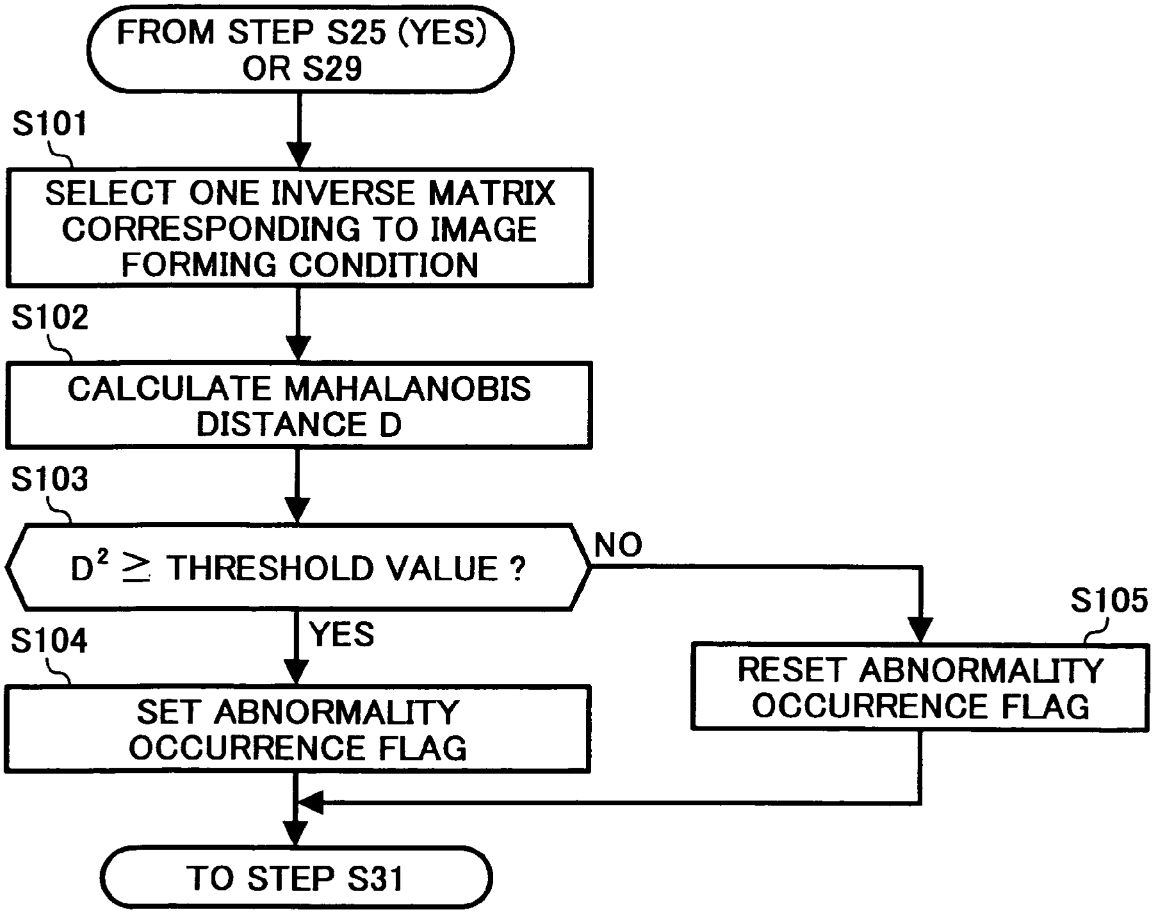
FIG. 20 is a flowchart of control operation steps in an abnormality determining process performed by the calculation processing unit of the abnormality determining apparatus according to another embodiment of the present invention.

FIG. 20 is a flowchart of control operation steps in an abnormality determining process performed by the calculation processing unit 502 of the abnormality determining apparatus. First, one inverse matrix which corresponds to the image forming condition obtained by the image forming condition obtaining device in step S81 in FIG. 18 is selected from a plurality of inverse matrixes which have been constructed by each image forming condition in step S101. Subsequently, in step S102 the Mahalanobis distance D is calculated based on the inverse matrix A selected in step S101 and the grouped information obtained in step S22 in FIG. 12A. Then, the CPU 502*a* determines if the square of the Mahalanobis distance D is equal to or greater than a threshold value in step S103. If the answer is YES in step S103, an abnormality occurrence flag is set in step S104. Then, the control operation proceeds to step S31 in FIG. 12B, and a user or a service person, for example, is notified of occurrence of an abnormality. If the answer is NO in step S103, an abnormality occurrence flag is reset in step S105. Then, the control operation proceeds to step S31 in FIG. 12B, and returns to reexecute step S21 in FIG. 12A without notifying a user or a service person, for example, of occurrence of an abnormality.

In the abnormality determining apparatus described with reference to FIGS. 18 through 20, the calculation processing unit 502 is configured to construct the normal group data set distinguished by the image forming condition. Thus, the grouped information obtained under the image forming condition resulting in a low degree of abnormality perception is prevented from being incorporated into the normal group data set. Accordingly, the problem that abnormality is hardly detected under the image forming condition resulting in a relatively high degree of abnormality perception can be controlled.

Next, an abnormality determining apparatus according to another embodiment of the present invention is described with reference to FIGS. 21 through 23. In this abnormality determining apparatus, the calculation processing unit 502 is configured to construct the normal group data set distinguished by user information and by an image forming condition.

Figure 21:
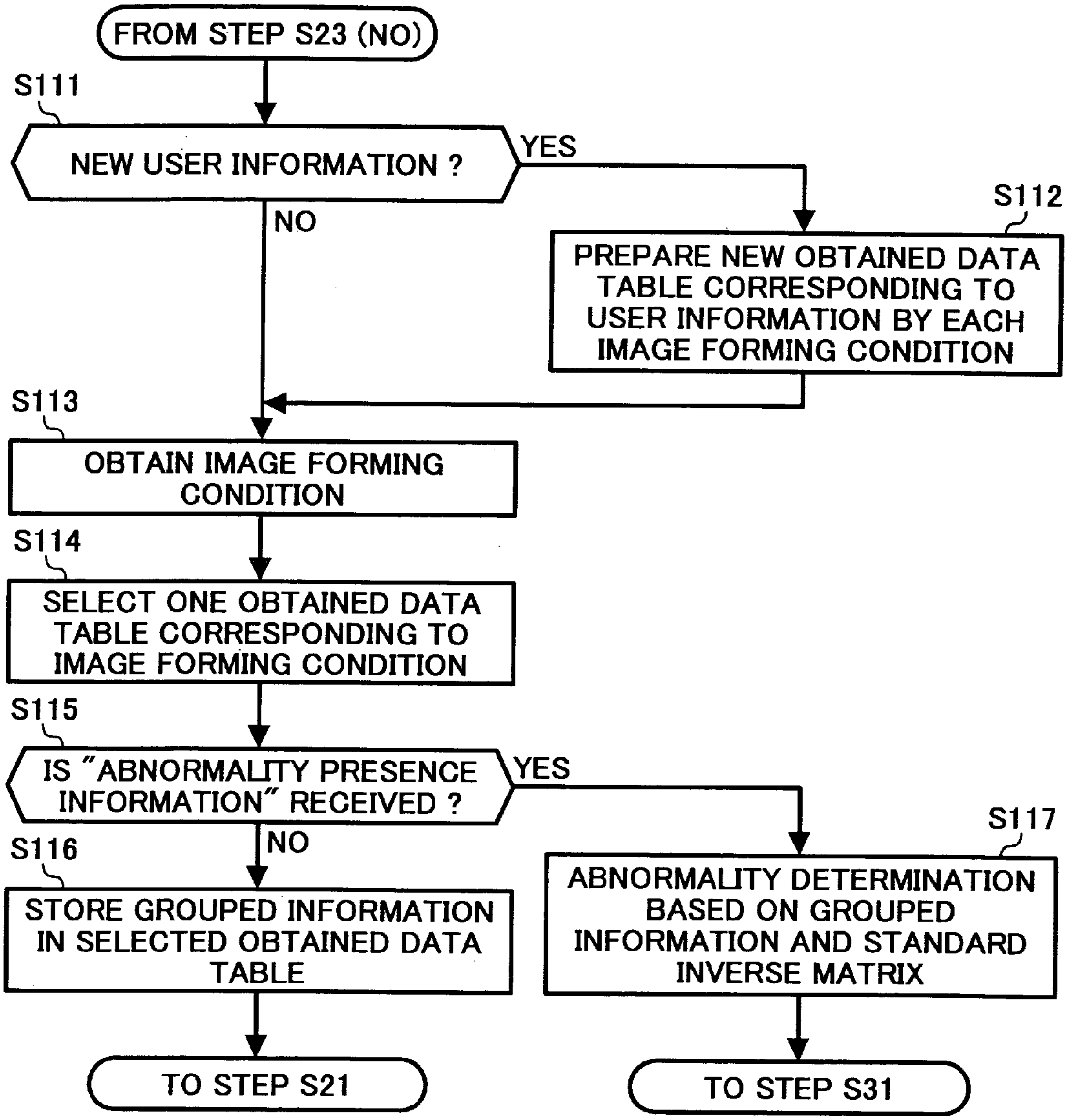
FIG. 21 is a flowchart of control operation steps in a normal group data set constructing process performed by the calculation processing unit of the abnormality determining apparatus according to another embodiment of the present invention.

FIG. 21 is a flowchart of control operation steps in a normal group data set constructing process performed by the calculation processing unit 502 of the abnormality determining apparatus. In step S111, the CPU 502*a* determines if user information input by a user is new user information. If the user information is new user information in step S111 (the answer is YES), an obtained data table corresponding to the new user information is newly prepared by each image forming condition in step S112. That is, a plurality of new obtained data tables are prepared. Then, the control operation proceeds to step S113. If the user information is not new user information in step S111 (the answer is NO), the control operation also proceeds to step S113. In step S113, the image forming condition obtaining device obtains data of an image forming condition transmitted from the image forming apparatus or a personal computer. Subsequently, in step S114, one obtained data table which corresponds to the image forming condition obtained in step S113 is selected from a plurality of obtained data tables which correspond to the user information input by the user in step S111 and which have been prepared by each image forming condition in step S112. Then, the CPU 502*a* determines if "abnormality presence information" is received by the data input unit 504 in step S115. If the "abnormality presence information" is not received by the data input unit 504 in step S115 (the answer is NO), in step S116, the grouped information obtained in step S22 in FIG. 12A is stored in the obtained data table selected in step S114. Then, the control operation returns to reexecute step S21 in FIG. 12A.

If the "abnormality presence information" is received by the data input unit 504 in step S115 (the answer is YES), an abnormality determining process is performed based on the grouped information obtained in step S22 in FIG. 12A and the standard inverse matrix A stored in the information storing unit 503, in step S117. Then, the control operation proceeds to step S31 in FIG. 12B, and a user or a service person, for example, is notified of occurrence of an abnormality.

Figure 22:
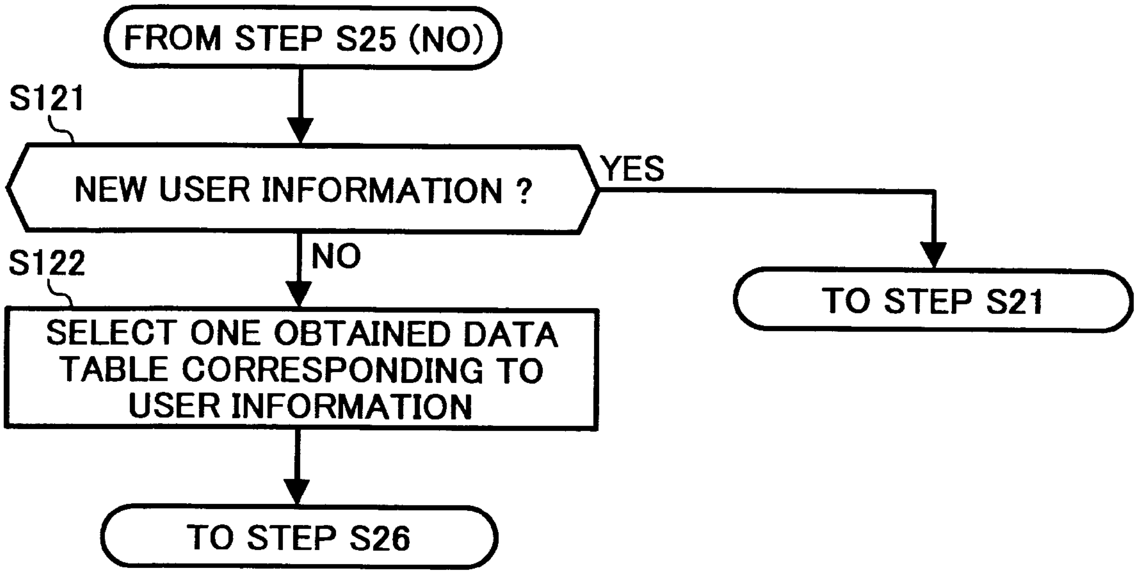
FIG. 22 is a flowchart of control operation steps in an inverse matrix constructing preparation process performed by the calculation processing unit of the abnormality determining apparatus according to another embodiment of the present invention.

FIG. 22 is a flowchart of control operation steps in an inverse matrix constructing preparation process performed by the calculation processing unit 502 of the abnormality determining apparatus. The inverse matrix constructing preparation process is performed between steps S25 and S26 in FIG. 12B. If the CPU 502*a* determines that the inverse matrix A has not been constructed in step S25 (the answer is NO) in FIG. 12B, the CPU 502*a* determines if user information input by a user is new user information in step S121. If the answer is YES in step S121, the control operation returns to reexecute step S21 in FIG. 12A without performing an abnormality determination. If the user information is not new user information in step S121 (the answer is NO), in step S122, one obtained data table which corresponds to the user information input by the user in step S121 is selected from a plurality of obtained data tables which correspond to the user information input by the user in step S111 and which have been prepared by each image forming condition in step S112. Subsequently, the control operation proceeds to step S26 in FIG. 12B, and an inverse matrix A corresponding to the image forming condition is constructed in steps S26 through S29 in FIG. 12B. Then, although a flowchart is omitted, the control operation returns to step S122 in FIG. 20 to select the second obtained data table which corresponds to another image forming condition relative to the user information. Then, an inverse matrix A corresponding to the second image forming condition relative to the user information is constructed in steps S26 through S29 in FIG. 12B. A sequence (from step S122 in FIG. 22 to steps S26 through S29 in FIG. 12B and to step S122 in FIG. 22) is repeated until all the inverse matrixes A corresponding to all the preset image forming conditions relative to the user information are constructed.

Figure 23:
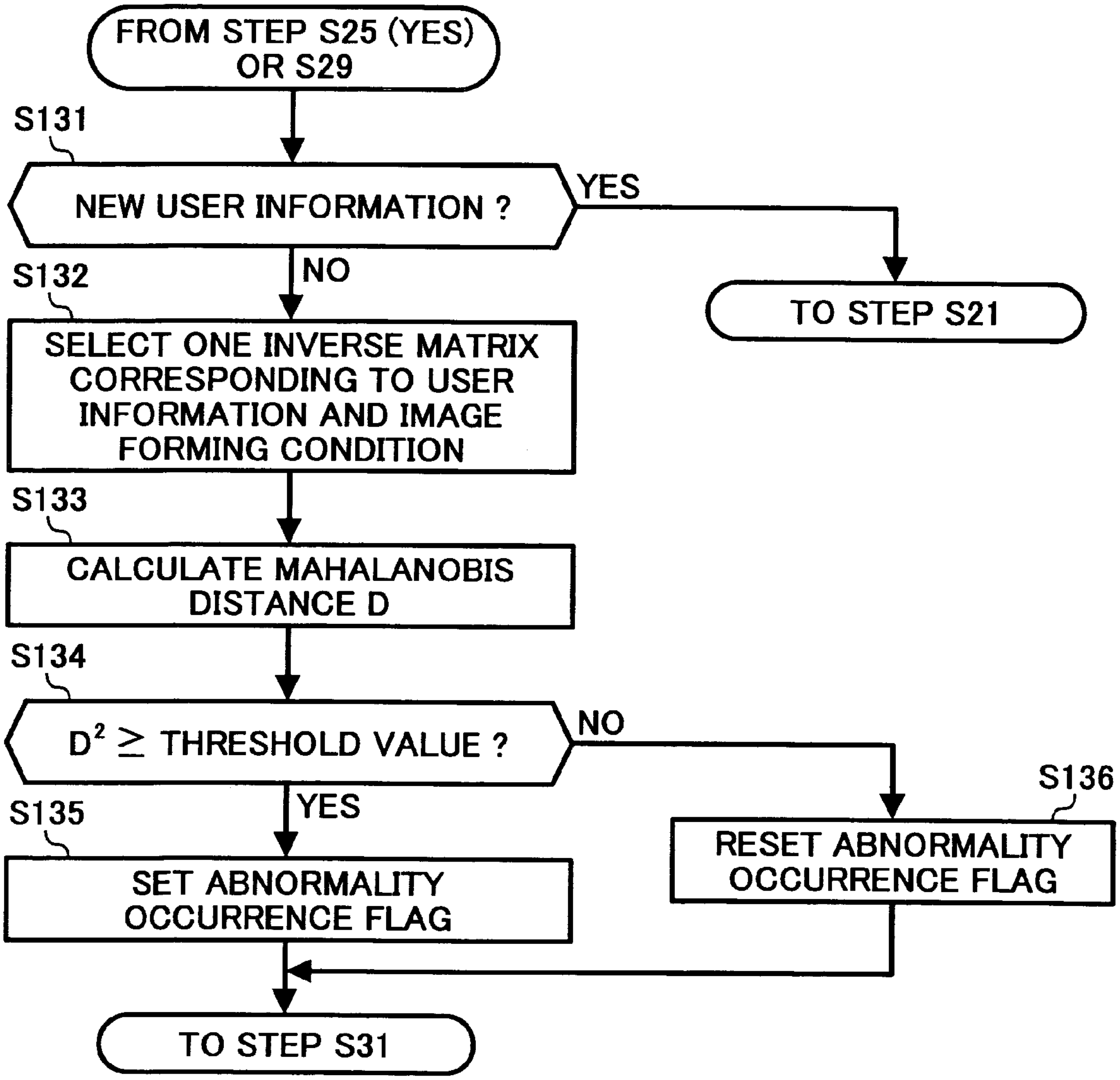
FIG. 23 is a flowchart of control operation steps in an abnormality determining process performed by the calculation processing unit of the abnormality determining apparatus according to another embodiment of the present invention.

FIG. 23 is a flowchart of control operation steps in an abnormality determining process performed by the calculation processing unit 502 of the abnormality determining apparatus. First, the CPU 502*a* determines if user information input by a user is new user information in step S131. If the answer is YES in step 5131, an inverse matrix corresponding to the user information does not exist, and an abnormality determining process cannot be performed. Therefore, in this case, the control operation returns to reexecute step S21 in FIG. 12A without performing an abnormality determination. If the user information is not new user information in step S131 (the answer is NO), one inverse matrix A which corresponds to the user information input by the user in step S131 and corresponds to the image forming condition obtained by the image forming condition obtaining device in step S81 in FIG. 18 is selected from a plurality of inverse matrixes which have been constructed by each user information and each image forming condition, in step S132. Subsequently, in step S133, the Mahalanobis distance D is calculated based on the inverse matrix A selected in step S132 and the grouped information obtained in step S22 in FIG. 12A. Then, the CPU 502*a* determines if the square of the Mahalanobis distance D is equal to or greater than a threshold value in step S134. If the answer is YES in step S134, an abnormality occurrence flag is set in step S135. Then, the control operation proceeds to step S31 in FIG. 12B, and a user or a service person, for example, is notified of occurrence of an abnormality. If the answer is NO in step S134, an abnormality occurrence flag is reset in step S136. Then, the control operation proceeds to step S31 in FIG. 12B, and returns to reexecute step S21 in FIG. 12A without notifying a user or a service person, for example, of occurrence of an abnormality.

The above-described abnormality determining apparatus according to the embodiment of the present invention may be integrated into the image forming apparatus acting as a detection subject. If an abnormality determining apparatus is provided independently of the image forming apparatus, various information obtained by various sensors of the image forming apparatus is transmitted to a receiving device acting as the information obtaining unit 501 of the abnormality determining apparatus through a data transmitting device. However, if the abnormality determining apparatus is integrated into the image forming apparatus, the cost for the data transmitting device can be reduced. Further, the control unit 1 of the image forming apparatus can be used as the calculation processing unit 502 of the abnormality determining apparatus, and the operation unit, such as a touch panel, and a numeric keypad of the operation display unit 3 of the image forming apparatus can be used as the data input unit 504 of the abnormality determining apparatus, resulting in a cost reduction. Moreover, the display unit, such as a liquid crystal display, of the operation display unit 3 of the image forming apparatus can be used as the determination result output unit 505 of the abnormality determining apparatus.

Alternatively, a majority of the abnormality determining apparatus may be integrated into the image forming apparatus, but at least the data input unit 504 acting as the abnormality presence/absence information receiving unit of the abnormality determining apparatus may be disposed independently of the image forming apparatus. In this configuration, for example, a server may act as the abnormality presence/absence information receiving unit that is connected to the image forming apparatus and a personal computer via communication lines. As compared to the calculation processing unit 502 and the determination result output unit 505 of the abnormality determining apparatus, the abnormality presence/absence information receiving unit of the abnormality determining apparatus is relatively difficult to be shared by the unit of the image forming apparatus. So, by disposing the abnormality presence/absence information receiving unit of the abnormality determining apparatus independently of the image forming apparatus, the abnormality determining apparatus can be configured to receive "abnormality presence information" without causing major design changes of the image forming apparatus.

The present invention has been described with respect to the exemplary embodiments illustrated in the figures. However, the present invention is not limited to these embodiments and may be practiced otherwise.

The above-described invention may be applied to an abnormality determining apparatus that determines the presence or absence of abnormality in a detection subject other than the image forming apparatus.

Numerous additional modifications and variations of the present invention are possible in light of the above teachings. It is therefore to be understood that within the scope of the appended claims, the present invention may be practiced otherwise than as specifically described herein.

The invention claimed is:

1. An abnormality determining apparatus, comprising: an information obtaining device configured to obtain information of a detection subject during a preset period after a start of an initial operation of the abnormality determining apparatus at a user destination, wherein the detection subject comprises an image forming apparatus configured to form an image on a recording medium;

a receiving device configured to receive, only during the preset period after the start of the initial operation of the abnormality determining apparatus at the user destination, a user input of abnormality presence information indicative of the presence of an abnormality in the detection subject detected by the user;

a normal group data set constructing device configured to exclude information of the detection subject obtained by the information obtaining device when the abnormality presence information input by the user is received from information of the detection subject obtained by the information obtaining device, to generate information of the detection subject that is a collection of normal data indicating that the detection subject is in a normal state, and to construct a normal group data set based on the generated information of the detection subject;

an information storing device configured to store the normal group data set constructed by the normal group data set constructing device; and a determining device configured to determine the presence of an abnormality in the detection subject by performing calculations based on the normal group data set stored in the information storing device and based on information obtained by the information obtaining device; and an image forming condition obtaining device configured to obtain an image forming condition of the image forming apparatus, wherein the normal group data set constructing device is configured to construct the normal group data set distinguished by the image forming condition comprising at least one of output image density condition and sheet type condition.

2. The abnormality determining apparatus according to claim 1, wherein the preset period comprises a period in which a predetermined time has elapsed since a start of an initial operation of the detection subject.

3. The abnormality determining apparatus according to claim 1, wherein the preset period comprises a period until a cumulative operation number of the detection subject reaches a predetermined number.

4. The abnormality determining apparatus according to claim 1, wherein the receiving device is configured to receive a signal indicative of the abnormality presence information transmitted from an external device.

5. The abnormality determining apparatus according to claim 1, further comprising:

a user information receiving device configured to receive user information of one of individual information and group information of the user, wherein the normal group data set constructing device is configured to construct the normal group data set distinguished by the user information.

6. The abnormality determining apparatus according to claim 5, wherein the user information receiving device is configured to receive a signal indicative of the user information transmitted from an external device.

7. The abnormality determining apparatus according to claim 1, wherein the image forming condition obtaining device is configured to receive a signal indicative of the image forming condition transmitted from one of the image forming apparatus and a computer that transmits an image information signal to the image forming apparatus.

8. The abnormality determining apparatus according to claim 1, wherein the abnormality determining apparatus is integrated into the detection subject.

9. The abnormality determining apparatus according to claim 1, wherein the receiving device is disposed independently of the detection subject.

10. An image forming apparatus, comprising:

a visual image forming device configured to form a visual image on a recording medium; and an abnormality determining apparatus configured to determine the presence of an abnormality in the image forming apparatus, the abnormality determining apparatus comprising:

an information obtaining device configured to obtain information of the image forming apparatus during a preset period after a start of an initial operation of the abnormality determining apparatus at a user destination;

a receiving device configured to receive, only during the preset period after the start of the initial operation of the abnormality determining apparatus at the user destination, a user input of abnormality presence information indicative of the presence of an abnormality in the image forming apparatus detected by the user;

a normal group data set constructing device configured to exclude information of the image forming apparatus obtained by the information obtaining device when the abnormality presence information input by the user is received from information of the image forming apparatus obtained by the information obtaining device, to generate information of the image forming apparatus that is a collection of normal data indicating that the image forming apparatus is in a normal state, and to construct a normal group data set based on the generated information of the image forming apparatus;

an information storing device configured to store the normal group data set constructed by the normal group data set constructing device;

a determining device configured to determine the presence of an abnormality in the image forming apparatus by performing calculations based on the normal group data set stored in the information storing device and based on information obtained by the information obtaining device; and an image forming condition obtaining device configured to obtain an image forming condition of the image forming apparatus, wherein the normal group data set constructing device is configured to construct the normal group data set distinguished by the image forming condition comprising at least one of output image density condition and sheet type condition.

11. The image forming apparatus according to claim 10, wherein the preset period comprises a period in which a predetermined time has elapsed since a start of an initial operation of the image forming apparatus.

12. The image forming apparatus according to claim 10, wherein the preset period comprises a period until a cumulative operation number of the image forming apparatus reaches a predetermined number.

13. The image forming apparatus according to claim 10, wherein the receiving device is configured to receive a signal indicative of the abnormality presence information transmitted from an external device.

14. The image forming apparatus according to claim 10, wherein the abnormality determining apparatus further comprises:

a user information receiving device configured to receive user information of one of individual information and group information of the user, wherein the normal group data set constructing device is configured to construct the normal group data set distinguished by the user information.

15. The image forming apparatus according to claim 14, wherein the user information receiving device is configured to receive a signal indicative of the user information transmitted from an external device.

16. The image forming apparatus according to claim 10, wherein the image forming condition obtaining device is configured to receive a signal indicative of the image forming condition transmitted from one of the image forming apparatus and a computer that transmits an image information signal to the image forming apparatus.

17. An image forming apparatus, comprising:

means for forming a visual image on a recording medium; and means for determining the presence of an abnormality in the image forming apparatus, comprising:

first means for obtaining information of the image forming apparatus during a preset period after a start of an initial operation of the means for determining the presence of an abnormality;

first means for receiving, only during the preset period after the start of the initial operation of the abnormality determining apparatus at a user destination, a user input of abnormality presence information indicative of the presence of an abnormality in the image forming apparatus detected by the user;

means for excluding information of the image forming apparatus obtained by the first means for obtaining information when the abnormality presence information input by the user is received from information of the image forming apparatus obtained by the first means for obtaining information, to generate information of the image forming apparatus that is a collection of normal data indicating that the image forming apparatus is in a normal state, and for constructing a normal group data set based on the generated information of the image forming apparatus;

means for storing normal group data set constructed by the means for constructing normal group data set;

means for determining the presence of an abnormality in the image forming apparatus by performing calculations based on the normal group data set stored in the means for storing and based on information obtained by the first means for obtaining; and second means for obtaining an image forming condition of the image forming apparatus, wherein the means for constructing constructs the normal group data set distinguished by the image forming condition comprising at least one of output image density condition and sheet type condition.

18. The image forming apparatus according to claim 17, wherein the first means for receiving receives a signal indicative of the abnormality presence information transmitted from an external device.

19. The image forming apparatus according to claim 17, wherein the means for determining further comprises:

second means for receiving user information of one of individual information and group information of the user, wherein the means for constructing constructs the normal group data set distinguished by the user information.

20. The image forming apparatus according to claim 19, wherein the second means for receiving receives a signal indicative of the user information transmitted from an external device.

21. The image forming apparatus according to claim 17, wherein the second means for obtaining receives a signal indicative of the image forming condition transmitted from one of the image forming apparatus and a computer that transmits an image information signal to the image forming apparatus.

22. An abnormality determining method, comprising:

first obtaining information of a detection subject during a preset period after a start of an initial operation of the abnormality determining apparatus at a user destination, wherein the detection subject comprises an image forming apparatus configured to form an image on a recording medium;

first receiving, only during the preset period after the start of the initial operation of the abnormality determining apparatus at the user destination, a user input of abnormality presence information indicative of the presence of an abnormality in the detection subject detected by the user;

constructing, in a processor, a normal group data set by excluding information of the detection subject obtained by the information obtaining device when the abnormality presence information input by the user is received from information of the detection subject obtained by the first obtaining, to generate information of the detection subject that is a collection of normal data indicating that the detection subject is in a normal state, and based on the generated information of the detection subject;

storing, in an information storing device, the constructed normal group data set;

determining, in the processor, the presence of an abnormality in the detection subject by performing calculations based on the constructed normal group data set and the obtained information; and second obtaining an image forming condition of the image forming apparatus, wherein the constructing comprises constructing the normal group data set distinguished by the image forming condition comprising at least one of output image density condition and sheet type condition.

23. The abnormality determining method according to claim 22, wherein the preset period comprises a period in which a predetermined time has elapsed since a start of an initial operation of the detection subject.

24. The abnormality determining method according to claim 22, wherein the preset period comprises a period until a cumulative operation number of the detection subject reaches a predetermined number.

25. The abnormality determining method according to claim 22, wherein the first receiving comprises receiving a signal indicative of the abnormality presence/absence information transmitted from an external device.

26. The abnormality determining method according to claim 22, further comprising:

second receiving user information of one of individual information and group information of the user, wherein the constructing comprises constructing the normal group data set distinguished by the user information.

27. The abnormality determining method according to claim 26, wherein the second receiving comprises receiving a signal indicative of the user information transmitted from an external device.

28. The abnormality determining method according to claim 22, wherein the second obtaining comprises receiving a signal indicative of the image forming condition transmitted from one of the image forming apparatus and a computer that transmits an image information signal to the image forming apparatus.

* * * * *